(12) United States Patent
Yu et al.

(10) Patent No.: US 9,646,425 B2
(45) Date of Patent: May 9, 2017

(54) INSPECTION PROGRAM EDITING ENVIRONMENT WITH EDITING ENVIRONMENT AUTOMATICALLY GLOBALLY RESPONSIVE TO EDITING OPERATIONS IN ANY OF ITS PORTIONS

(71) Applicants: Mitutoyo Corporation, Kanagawa-ken (JP); Mitutoyo Europe GmbH, Neuss (DE)

(72) Inventors: Dahai Yu, Redmond, WA (US); Eric Yeh-Wei Tseo, Kirkland, WA (US)

(73) Assignees: Mitutoyo Corporation, Kanagawa-ken (JP); Mitutoro Europe GMBH, Neuss (DE)

( * ) Notice: Subject to any disclaimer, the term of this patent is extended or adjusted under 35 U.S.C. 154(b) by 35 days.

(21) Appl. No.: 14/703,814

(22) Filed: May 4, 2015

(65) Prior Publication Data
US 2016/0300396 A1    Oct. 13, 2016

Related U.S. Application Data

(63) Continuation-in-part of application No. 14/682,976, filed on Apr. 9, 2015.

(51) Int. Cl.
*G06T 19/20*    (2011.01)

(52) U.S. Cl.
CPC ...... *G06T 19/20* (2013.01); *G06T 2219/2021* (2013.01)

(58) Field of Classification Search
CPC ........... G05B 2219/35012; G05B 2219/35346; G05B 2219/35031; G05B 2219/37198;
(Continued)

(56) References Cited

U.S. PATENT DOCUMENTS

| 4,901,253 A | 2/1990 | Iwano et al. |
| 4,908,951 A | 3/1990 | Gurny |

(Continued)

FOREIGN PATENT DOCUMENTS

| EP | 1 330 686 A2 | 7/2003 |
| WO | 02/23292 A2 | 3/2002 |

OTHER PUBLICATIONS

PC-DMIS Product Brochure, Hexagon Metrology, 2013, 24 pages.*
(Continued)

*Primary Examiner* — Haixia Du
(74) *Attorney, Agent, or Firm* — Seed Intellectual Property Law Group LLP

(57) ABSTRACT

A system is provided for programming workpiece feature inspection operations for a coordinate measuring machine. The system includes a computer-aided design (CAD) file processing portion and a user interface comprising a 3D view, and editable plan representation. Both the 3D view and the editable plan representation are configure to be automatically responsive to operations in a first set of editing operations, regardless of whether the operations are performed in the 3D view or the editable plan representation of the user interface. The first set of editing operations may comprise deleting (or adding) at least one workpiece feature in the 3D view or the editable plan representation of the user interface, for example. Various other portions of the system (e.g. other user interface windows) may also be automatically responsive to the first set of editing operations, regardless of where the editing operations are performed in the user interface.

16 Claims, 21 Drawing Sheets

(58) Field of Classification Search
CPC ........... G05B 2219/37443; G05B 2219/37576; G05B 19/4068; G05B 2219/35134; G05B 2219/37205; G06F 17/50; G06T 17/00; G06T 2200/24; G06T 17/10

See application file for complete search history.

(56) References Cited

U.S. PATENT DOCUMENTS

| | | | |
|---|---|---|---|
| 5,465,221 | A | 11/1995 | Merat et al. |
| 5,471,406 | A | 11/1995 | Breyer et al. |
| 7,058,472 | B2 | 6/2006 | Mathews et al. |
| 7,146,291 | B2 | 12/2006 | Hough |
| 7,652,275 | B2 | 1/2010 | Gladnick |
| 7,783,445 | B2 | 8/2010 | McLean et al. |
| 8,028,085 | B2 | 9/2011 | Elien et al. |
| 8,302,031 | B1 | 10/2012 | Sang |
| 8,438,746 | B2 | 5/2013 | Usui |
| 8,957,960 | B2 | 2/2015 | Saylor et al. |
| 9,013,574 | B2 | 4/2015 | Saylor et al. |
| 2009/0136114 | A1* | 5/2009 | Wu .................... G06K 9/00 382/141 |
| 2013/0120553 | A1 | 5/2013 | Delaney et al. |
| 2013/0120567 | A1 | 5/2013 | Northrup et al. |
| 2013/0125044 | A1 | 5/2013 | Saylor et al. |
| 2014/0185910 | A1 | 7/2014 | Bryll et al. |
| 2015/0300798 | A1* | 10/2015 | Pettersson .............. G01B 21/04 33/503 |

OTHER PUBLICATIONS

PC-DMIS CMM Manual, Wilcox Associates, Inc., last updated: Feb. 26, 2015, 251 pages.*

YouTube, "CMM Inspection Programming Automation—PAS CMM for Solid Works," Uploaded on Jun. 2, 2010, retrieved from http://www.youtube.com/watch?v=rAbDGXNGryc, DVD.

YouTube, "CMM off line Programming in CATIA V5," Published on Oct. 22, 2013, retrieved from https://www.youtube.com/watch?v=qWecGeK4xtA, DVD.

YouTube, "CMM Programming—How to create inspection-ready programs in NX (Siemens PLM)," Published Nov. 8, 2012, retrieved from https://www.youtube.com/watch?v=h8wHfkPdT10, DVD.

YouTube, "Metrology Spotlight: Introducing PC-DMIS 2 014 (TV511)," Published Jun. 3, 2014, retrieved from https://www.youtube.com/watch?v=QPCGbTEpyW8, DVD.

YouTube, "PAS CMM Inspection Automation Software—Introduction," Uploaded Jun. 1, 2010, retrieved from http://www.youtube.com/watch?v=0D8iLm_eJIE, DVD.

YouTube, "Pcdmis AutoPath," Uploaded Sep. 14, 2009, retrieved from https://www.youtube.com/watch?v=ag04aUvo49A, DVD.

YouTube, "Renishaw PH20 Collision Avoidance by VDMIS CMM Software," Published Jan. 31, 2014, retrieved from http://www.youtube.com/watch?v=OjMZH44n5fY, DVD.

YouTube, "VDMIS CMM Software and CMM Retrofit Solutions," Published on Jan. 3, 2014, retrieved from http://www.youtube.com/watch?v=Rj0tWs553yo, DVD.

Berkelaar et al., Wilcox Associates, Inc., "PC-DMIS 4.3 Reference Manual Window XP and Vista Version," May 1, 2004, Version 5.1.0.0.

Mitutoyo America Corporation, "Automatic Measurement Program Generation Software," Bulletin No. 2150, MiCAT Planner, 0614-05, Aurora IL, Aug. 2014, 2 pages.

Mitutoyo America Corporation, "CMM Software Suite," Bulletin No. 1701, MiCAT, 10B-4, Aurora IL, Oct. 2003, 16 pages.

* cited by examiner

INSPECTION PROGRAM EDITING ENVIRONMENT WITH EDITING ENVIRONMENT AUTOMATICALLY GLOBALLY RESPONSIVE TO EDITING OPERATIONS IN ANY OF ITS PORTIONS

CROSS-REFERENCE TO RELATED APPLICATION(S)

This application is a continuation-in-part of U.S. patent application Ser. No. 14/682,976, entitled "Inspection Program Editing Environment Including Real Time Feedback Related to Throughput" filed on Apr. 9, 2015, the disclosure of which is hereby incorporated by reference in its entirety.

BACKGROUND

Technical Field

This disclosure relates to precision metrology, and more particularly to editing inspection programs for coordinate measuring machines.

Description of the Related Art

Certain metrology systems, including coordinate measurement machines (CMMs), can be utilized to obtain measurements of inspected workpieces and may be controlled at least in part by workpiece feature inspection operations that have been programmed on a computer. One exemplary prior art CMM is described in U.S. Pat. No. 8,438,746, which is hereby incorporated by reference in its entirety. As described in the '746 patent, the CMM includes a probe for measuring a workpiece, a movement mechanism for moving the probe, and a controller for controlling the movement mechanism.

A CMM that includes a surface scanning probe is described in U.S. Pat. No. 7,652,275 (the '275 patent), which is hereby incorporated herein by reference in its entirety. After a scan, a three-dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is hereby incorporated herein by reference in its entirety.

In all of the above described CMMs, operations may be programmed for inspecting workpiece features. Such programmed operations may generally be reviewed to see which workpiece features are being inspected and in what order, and may also be edited by adding, removing or otherwise altering particular program elements operations that are associated with particular workpiece features. However, in existing CMM programming systems, such reviewing and editing operations are not always easy for a user to perform or to understand. For example, it may be difficult for a user to track where and how such programmed operations fit within an overall inspection plan, different windows may be provided with different types of information about the programmed operations, and it may difficult to understand the various effects that certain types of edits may produce relative to altering the efficiency or effectiveness for the inspection of a particular workpiece feature or for the overall inspection plan. A need exists for a system and/or user interface features which allow such understanding in an immediate and intuitive manner during inspection program creation, review and/or editing for a CMM.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for programming workpiece feature inspection operations for a coordinate measuring machine. The coordinate measuring machine (CMM) may include at least one sensor used for determining workpiece feature measurement data, a stage for holding a workpiece wherein at least one of the sensor or the stage are movable relative to one another, and a CMM control portion. The system includes a computer-aided design (CAD) file processing portion and a user interface. The computer-aided design (CAD) file processing portion inputs a workpiece CAD file corresponding to a workpiece and analyzes the file to automatically determine inspectable workpiece features on the workpiece corresponding to a plurality of geometric feature types.

In various implementations, the user interface may include a workpiece inspection program simulation portion configurable to display a 3-D view including at least one of workpiece features on the workpiece and inspection operation representations corresponding to inspection operations to be performed on workpiece features according to a current workpiece feature inspection plan; and an editing user interface portion comprising an editable plan representation of the current workpiece feature inspection plan for the workpiece corresponding to the CAD file, the editable plan representation comprising at least one of workpiece features or inspection operation representations.

In various embodiments, the system is configured with both of the 3D view and the editable plan representation being automatically responsive to editing operations included in a first set of editing operations, regardless of whether the editing operations included in the first set of editing operations are performed in the 3D view or the editable plan representation of the user interface. The first set of editing operations comprises deleting (or adding) at least one workpiece feature in the 3D view or the editable plan representation of the user interface. The 3D view and the editable plan representation are both automatically responsive to deleting (or adding) the at least one workpiece feature in the 3D view or the editable plan representation the user interface, by automatically deleting (or adding) the at least one workpiece feature and associated inspection operations in both the 3D view and the editable plan representation.

The system may include an inspection path/sequence manager. The inspection path/sequence manager may be also be automatically responsive to editing operations included in a first set of editing operations as described in greater detail below, regardless of whether the editing operations included in the first set of editing operations are performed in the 3D view or the editable plan representation of the user interface.

The system user interface may also include a program view portion. The program view portion may be also be automatically responsive to editing operations included in a first set of editing operations, regardless of whether the editing operations included in the first set of editing operations are performed in the 3D view or the editable plan representation of the user interface, or in the program view portion itself. In some embodiments, the program view may be regarded as a "secondary" editable inspection plan representation, as described in greater detail below.)

DETAILED DESCRIPTION

Figure 1:
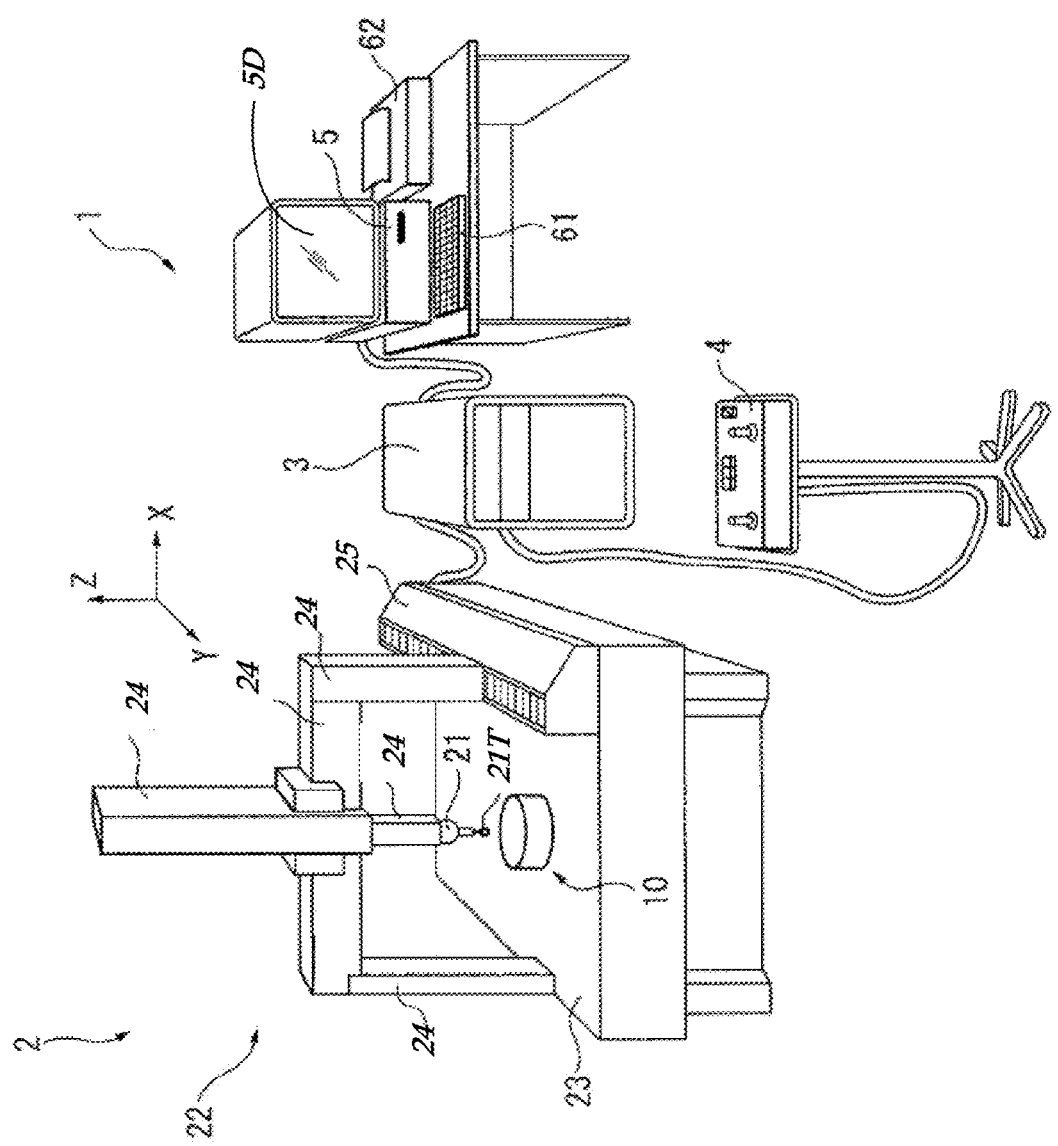
FIG. 1 is a diagram showing various typical components of a metrology system comprising a CMM.

FIG. 1 is a diagram showing various typical components of a metrology system 1 including a generic CMM, which provides one context for application of the principles disclosed herein. Certain aspects of the metrology system 1 are further described in the '746 patent. The metrology system 1 may include: a CMM body 2; a motion controller 3 that controls a drive of the coordinate measuring machine body 2; an operating unit 4 for manually operating the coordinate measuring machine body 2; a host computer 5 that issues commands to the motion controller 3 and executes processing such as for the inspection of features on a workpiece 10 (an object to be measured) disposed on the CMM body 2. A representative input unit 61 and output unit 62 are connected to the host computer 5, as well as a display unit 5D. The display unit 5D may display a user interface, for example as described further below with respect to FIGS. 3-10.

The CMM body 2 may include: a probe 21 having a stylus 21T which may contact a surface of the workpiece 10; a movement mechanism 22 that includes a three-axis slide mechanism 24 that holds the base end of the probe 21; a measurement stage 23 that holds the workpiece 10 and on which a drive mechanism 25 moves the slide mechanism 24. In various implementations, the drive mechanism 25 may be controlled by a CMM control portion (e.g., including the motion controller 3). As will be described in more detail below, in various implementations one or more sensors of the CMM (e.g., including the probe 21 and/or stylus 21T) may be moved relative to the measurement stage 23 (e.g., as controlled by the motion controller 3) and utilized for determining workpiece feature measurement data (e.g., with regard to physical dimensions of features of the workpiece 10).

Figure 2A:
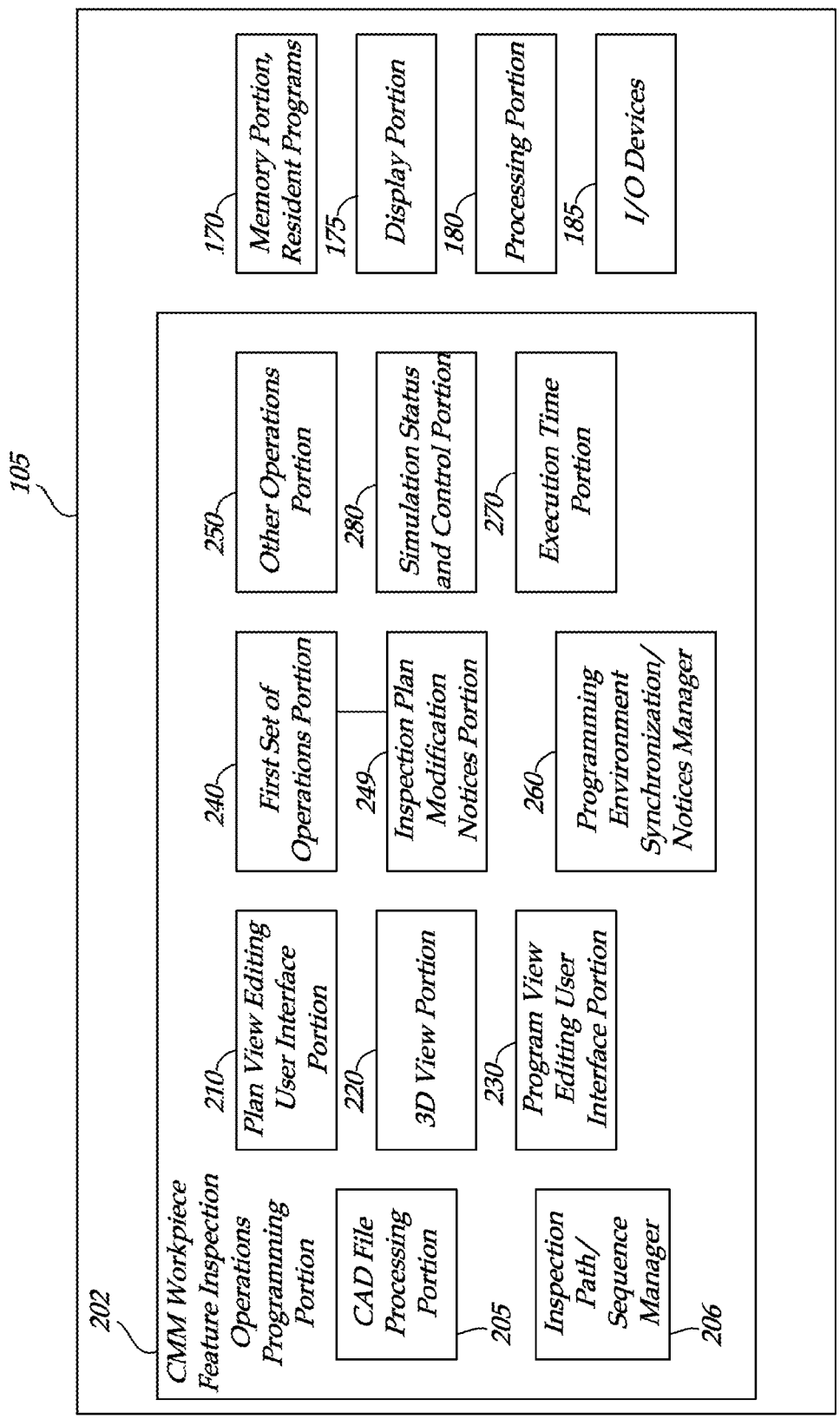
FIGS. 2A and 2B are diagrams showing various elements of a one embodiment of a computing system on which workpiece feature inspection operations may be programmed for the CMM of FIG. 1.
Figure 2B:
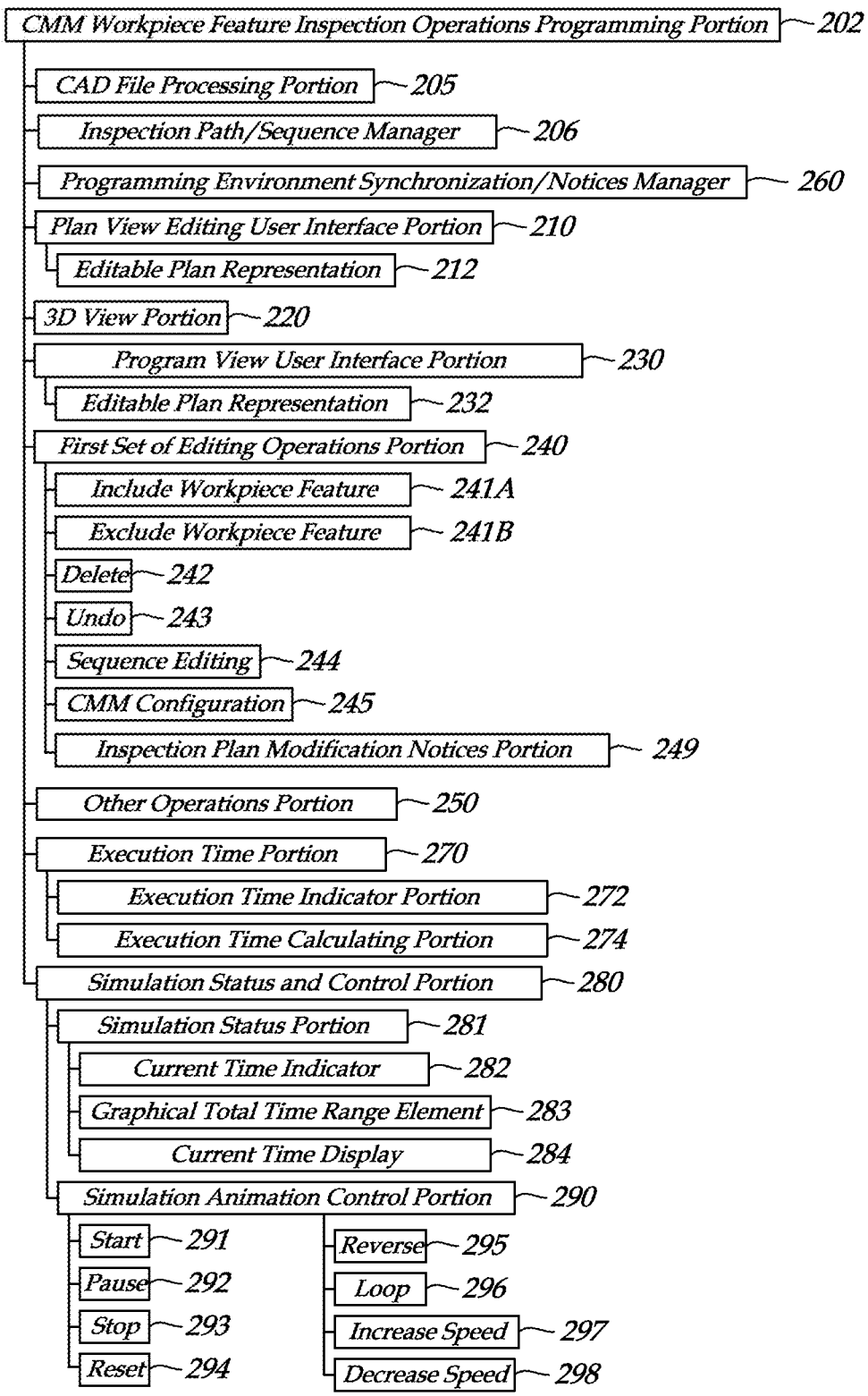

FIGS. 2A and 2B are diagrams of a computing system 105 including one embodiment of a programming portion 202 on which workpiece feature inspection operations may be programmed for a CMM (e.g., the CMM body 2 of FIG. 1). As shown in FIG. 2A, in various implementations the computing system 105 (e.g., the computer 5 of FIG. 1 or a separate computer) may include a memory portion 170, a display portion 175, a processing portion 180, an input-output devices portion 185 and the programming portion 202. The memory portion 170 includes resident programs and other data utilized by the computing system 105. The display portion 175 provides the display for the computing system 105 (e.g., similar to the display unit 5D of FIG. 1), including the features provided by the programming portion 202. The processing portion 180 provides for the signal processing and control of the computing system 105, while the input-output devices portion 185 receives and provides control signals and outputs to and from various devices (e.g., the CMM controller 3 of FIG. 1).

As shown in FIGS. 2A and 2B, in one embodiment, the programming portion 202 includes a CAD file processing portion 205, an inspection path and/or sequence manager 206, a plan view editing user interface portion 210, a 3-D view portion 220, a program view editing user interface portion 230, a first set of operations portion 240, which may include an inspection plan modification notices portion 249, another operations portion 250, a programming environment synchronization and/or notices manager 260, an execution time portion 270, and a simulation status and control portion 280. In various implementations, the computer-aided design (CAD) file processing portion 205 inputs a workpiece CAD file corresponding to a workpiece (e.g., the workpiece 10 of FIG. 1) and analyzes the file to automatically determine inspectable workpiece features on the workpiece corresponding to a plurality of geometric feature types (e.g., cylinder, plane, sphere, cone, etc.) and the inspection path/sequence manager 206 may automatically determine a motion control path that allows the CMM to obtain measurements that characterize the workpiece features. Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein in their entirety, disclose various methods which may be used to analyze CAD data and determine geometric features of a workpiece and then automatically generate a motion control path for placing a probe or sensor at inspection points that measure or characterize the geometric features. European Patent Number EP1330686 also provides relevant teachings. In some embodiments, determining the geometric features may simply comprise extracting or recognizing the categorized geometric features inherently defined in some modern CAD systems. In some embodiments, product and manufacturing information (PMI, for short) is present in the CAD data, and may be used in the aforementioned processes. PMI conveys non-geometric attributes in CAD data, and may include geometric dimensions and tolerances, surface finish, and the like. In some embodiments, in the absence of PMI, default tolerances and other default inspection rules may be used in automatic operations of the CAD file processing portion 205 and the inspection path/sequence manager 206.

The motion control path may generally define a feature inspection sequence as well as individual inspection points (e.g., touch probe measurement points, or non-contact measurement points, or point cloud determination regions, etc.), as well as the motion path between such points. The sequence and motion path planning may follow simple rules that avoid collisions in some embodiments, or more complicated rules or processes that both avoid collisions and optimize motion path length or inspection time in other embodiments. In some embodiments, the CAD file processing portion 205 may include the inspection path/sequence manager 206, or they may be merged and/or indistinguishable. Applicable automatic path planning methods may be found in commercial products and/or the previously cited references, as well as in numerous technical and/or academic articles. In one embodiment, one or both of the aforementioned automatic processes may be automatically triggered when a target CAD file is identified in the programming portion 202. In other embodiments, one or both of the aforementioned automatic processes may be triggered in relation to a target CAD file based on operator input that initiates the processes. In other less desirable embodiments, similar processes may be semi-automatic and require user input in the programming portion 202 for certain operations or decisions.

In any case, in various embodiments the aforementioned processes may, in effect, be used to provide a comprehensive inspection plan and/or inspection program for a workpiece. In some contexts, the connotations of the term "inspection plan" may encompass primarily what features are to be inspected and what measurements are to be made on each, and in what sequence, and the connotations of the term "inspection program" may primarily encompass how the inspection plan is to be accomplished on a particular CMM configuration (e.g., following the "instructions" inherent in the inspection plan, but also including the motion speeds and path, the probe or sensor to be used, and so on for a defined CMM configuration.) Other portions of the programming portion 202 may use the results of the CAD file processing portion 205 and the inspection path/sequence manager 206 to perform their operations and populate and/or control their associated user interface portions, and the like. As shown in FIG. 2B, the plan view editing user interface portion 210 includes an editable plan representation 212 of a workpiece feature inspection plan for the workpiece corresponding to the CAD file. In various implementations, the program view editing user interface portion 230 may also (or instead) include an editable plan representation 232, as will be described in more detail below with respect to FIGS. 3-10.

Although it has been known to attempt to automatically generate an inspection plan and/or inspection program, subsequent editing and visualization of that plan and/or program have not been sufficiently intuitive or easy to use—particularly for relatively unskilled users. In particular, visualization of the effect of editing changes to the plan and/or program has not been immediately or continuously available in the user interface (e.g., through a displayed "3-D" simulation or moving animation). Rather, it has been typical to require the user to activate a special mode or display window that is not normally active in real time during editing operations in order to see a "recording" or specially generated simulation of the CMM running the edited inspection program. Similarly, the effect of editing changes to the plan and/or program on the total execution time of the inspection plan or program has not been immediately or continuously available in real time in the user interface during editing operations. Both types of "results" feedback—"immediate" visual confirmation of the editing results in a 3-D simulation or animation view, and/or immediate confirmation of the editing results on the total execution time—may be critical to the acceptance of an editing operation. For example, the total execution time relates directly to the inspection throughput of a CMM, which determines its cost of ownership and/or ability to support a desired rate of production.

Due to the value of such immediate feedback, particularly for relatively unskilled users or program editors, in some embodiments it is desirable for editing operations to be immediately incorporated (e.g., automatically or with very minimal effort by the user) into the current version of the inspection plan and/or inspection program, which is then reflected in the various portions of the programming portion 202 and its user interface(s). In the illustrated embodiment, this may be accomplished through the operations of the programming environment synchronization/notices manager 260, which in one embodiment may be implemented using known "publisher-subscriber" methods, which are sometimes implemented using XML-like languages (e.g., as used for notifications between web pages). In various embodiments, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g., as may be recorded or implemented using the programming environment synchronization/notices manager 260, for example.) Applicable to such cases, U.S. Pat. No. 8,028,085, which is hereby incorporated herein by reference in its entirety, describes low latency methods which may be adapted to support the features disclosed herein.

In one embodiment, determining and/or generating various workpiece features and measurement operations in the CAD file processing portion 205 and the inspection path/sequence manager 206 may include generating and/or sharing a unique identifier for each workpiece feature and measurement operation. When the results from those portions are used in other portions of the programming portion 202 (e.g., as outlined above), the various identifiers may also be used or cross-referenced in the other portions to establish relevant associations between corresponding workpiece features and/or inspection operations across the various processing and/or user interface portions.

The user interface of the programming portion 202 includes a first set of operations (which also include the underlying programming instructions and/or routines) usable to edit the workpiece feature inspection plan and/or inspection program. For example, the user interface operations may include selections of text or graphical elements that represent workpiece features or inspection operations, followed by activation of relevant commands or other user interface operations that affect the selected elements. In one embodiment, the first set of operations portion 240 may provide or identify such operations. In one embodiment, the inspection plan modification notices portion 249 may be responsive to operations included in the first set of operations portion 240 to provide a notice to the programming environment synchronization/notices manager 260 that an inspection plan modification is taking place.

In response, the programming environment synchronization/notices manager 260 may then (e.g., automatically) manage the exchange of various event or programming operation notifications and related unique identifiers, such that the CAD file processing portion 205 and/or the inspection path/sequence manager 206 appropriately edit or modify the current inspection plan and inspection program in a synchronized manner when one of the first set of operations is performed. Such plan and program modifications may be performed very quickly in various embodiments, because the unique identifiers described above may be used to efficiently focus the modifications on only those features and/or measurement operations affected by the currently active one of the first set of operations. After that, the programming environment synchronization/notices manager 260 may notify other portions of the programming portion 202 (e.g., as outlined above), so that they are immediately updated using information from the edited plan and/or program. The unique identifier(s) of the most recently edited elements may again be used to speed up such operations, in that the updating need only focus on those elements associated with the identifiers.

It should be appreciated that the programming environment synchronization/notices manager 260 may also manage inter-portion communications and exchanges besides those associated with the first set of operations (e.g., using various techniques and identifiers similar to those outlined above.) In various embodiments, it may facilitate the synchronization between the various user interface windows or portions of the programming portion 202. For example, selection of a particular feature or instruction in one window may automatically trigger a notification or instruction to other windows to display a corresponding feature or instruction in that other window, or depict a program operating state associated with the selected feature or instruction, or the like.

It will be appreciated that the embodiment(s) outlined above for achieving real-time editing operation synchronization between various portions of the programming portion 202 is exemplary only, and not limiting. For example, the function of the identifiers outlined above may be provided by suitable database or lookup table associations or the like, without the presence of an explicit "identifier". These and other alternatives will be apparent to one of ordinary skill in the art based on the teachings disclosed herein.

The execution time portion 270 may include an execution time indicator portion 272 and an execution time calculating portion 274. In order to provide valuable feedback to a user performing editing operations, the execution time indicator portion 272 may provide a "real-time" indication of an estimated inspection program execution time for operating the CMM to execute a workpiece inspection program corresponding to the current workpiece feature inspection plan as executed by a current CMM configuration. Using the techniques outlined above, the programming portion 202 may be configured such that the execution time indicator portion 272 is automatically updated in response to a utilization of one of the operations included in the first set of operations portion 240 to modify the current workpiece feature inspection plan, so as to automatically indicate the estimated effect of the modification on the inspection program execution time. In various implementations, the first set of editing operations portion 240 may include or identify operations corresponding to inclusion of a workpiece feature 241A, exclusion of a workpiece feature 241B, a delete command 242, an undo command 243, sequence editing 244 and altering a CMM configuration 245, each of which will be described in more detail below with respect to FIGS. 3-10. The first set of editing operations portion 240 may further include or identify operations corresponding to adding or deleting individual measurement points (e.g., touch points for a stylus) on a feature, or changing the motion plan for traversing between individual measurement points, or the like. Another operations portion 250 may include other operations relevant to the use and functioning of the programming portion 202 and/or general computing system 105. The 3-D view portion 220 may display a 3-D view including workpiece features on the workpiece and an indication of inspection operations to be performed on the workpiece features according to the current workpiece feature inspection plan. The simulation status and control portion 280 may include a simulation status portion 281 that is configured to characterize a state of progress through the current workpiece feature inspection plan corresponding to a currently displayed 3-D view, and the execution time indicator portion 272 may be displayed in conjunction with the simulation status portion 281.

In various implementations, as will be illustrated and described in more detail below with respect to FIGS. 3-10, the simulation status portion 281 may include a current time indicator 282 that moves along a graphical total time range element 283 to characterize a state of progress through the current workpiece feature inspection plan corresponding to the currently displayed 3-D view, and the execution time indicator 272 may be displayed in association with the graphical total time range element 283. In one implementation, the simulation status portion 281 further includes a current time display 284 which includes a numerical time representation that is automatically updated corresponding to the current time indicator 282 or the currently displayed 3-D view, and that further characterizes the state of progress through the current workpiece feature inspection plan corresponding to the currently displayed 3-D view. In one implementation, the simulation status and control portion 280 further includes a simulation animation control portion 290 which includes elements that are usable to control at least one of a start 291, pause 292, stop 293, reset 294, reverse 295, loop 296, increase in speed 297 or decrease in speed 298 of an animated display of simulated progress through the current workpiece feature inspection plan as displayed in the 3-D view.

In various implementations, the computing system 105 and/or other associated computer system(s) may include suitable unitary or distributed computing systems or devices, which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and in various implementations may be accessed via service calls.

Figure 3:
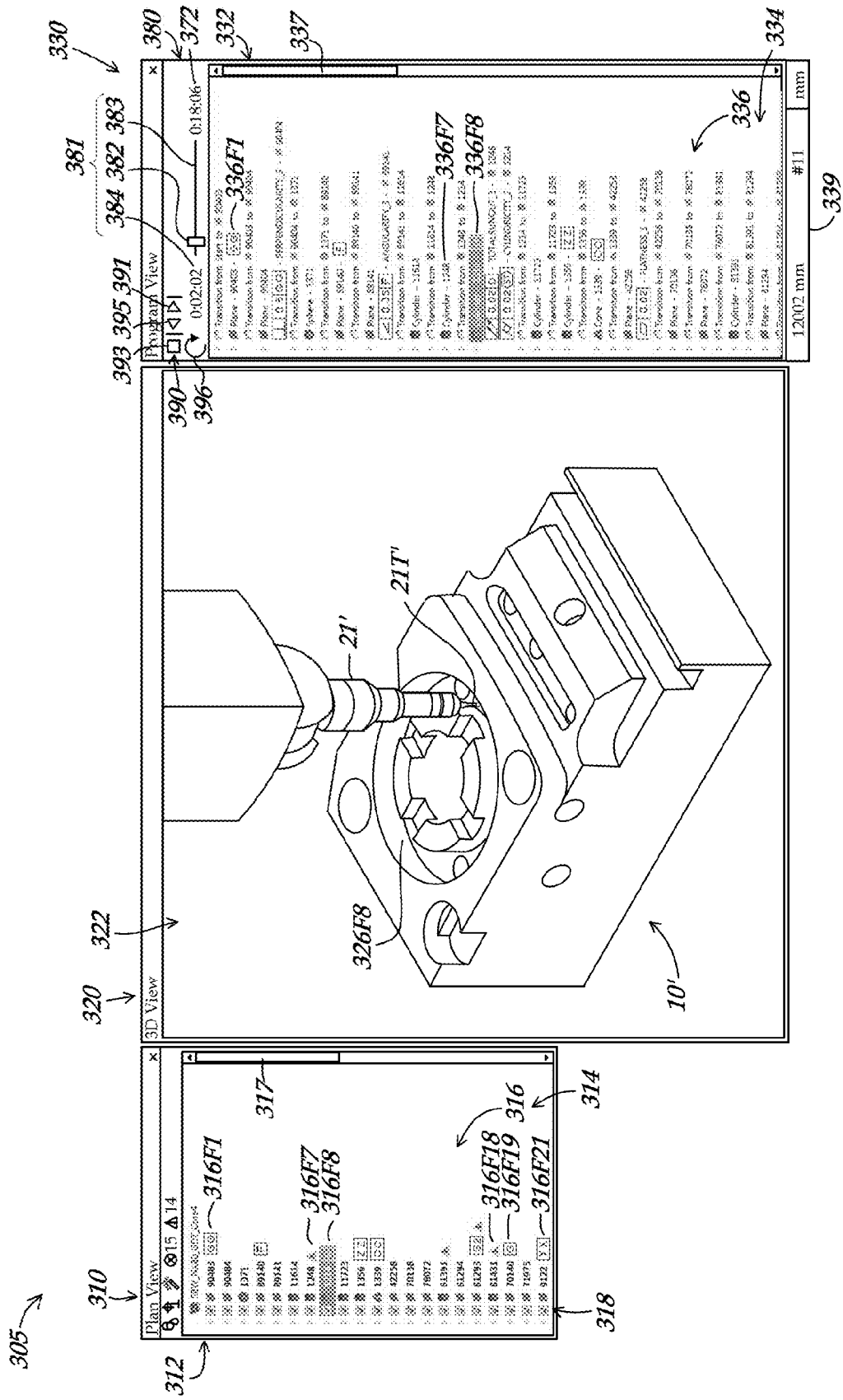
FIG. 3 is a diagram of a user interface in which all of the workpiece features of an editable plan representation are included in a set of workpiece features to be inspected according to the plan.

FIG. 3 is a diagram of a user interface 305 (e.g., as may be shown on the display unit 5D of FIG. 1, the display portion 175 of FIG. 2A, etc.) It will be appreciated that certain numbered elements 3XX of the user interface 305 may correspond to and/or be provided by similarly numbered elements 2XX of FIGS. 2A and 2B, except as otherwise described below. In the implementation shown in FIG. 3, the user interface 305 includes a plan view window 310, a 3-D view window 320 and a program view window 330. The plan view window 310 includes an editing user interface portion 312, the 3-D view window 320 includes a workpiece inspection program simulation portion 322, and the program view window 330 includes an editing user interface portion 332 and a simulation status and control portion 380. The editing user interface portions 312 and 332 each include plan representations 314 and 334, respectively, of a workpiece feature inspection plan for a workpiece 10 corresponding to a CAD file. The plan representation 314 is organized in terms of geometric features to be inspected on the workpiece. The plan representation 334 is organized as inspection program pseudo-code or actual code or graphical program operation representations or the like, in various embodiments. In the illustrated embodiment, each or both of the plan representations 314 and 334 are editable (that is, they are editable plan representations.) When editing operations are performed for one of the editable plan representations 314 and 334, the other plan representation may be automatically updated in a manner consistent with those editing operations by operation of the various system elements illustrated and described with respect to FIGS. 2A and 2B. However, in some embodiments, only one of the plan representations 314 and 334 need be editable. In such a case, the other plan representation may be absent, or hidden, or may be displayed and automatically updated in a manner similar to that outlined above.

As described above with respect to FIGS. 2A and 2B, in various implementations, a computer-aided design (CAD) file processing portion may input a workpiece CAD file corresponding to a workpiece 10 and may analyze the file to automatically determine inspectable workpiece features on the workpiece 10 corresponding to a plurality of geometric feature types (e.g., cylinder, plane, sphere, cone, etc.). In FIG. 3 the editing user interface portions 312 and 332 include editable plan representations 314 and 334 of the workpiece feature inspection plan for the workpiece 10 corresponding to the CAD file, wherein the editable plan representations 314 and 334 include the editable set of workpiece features 316 and 336 to be inspected. As will be described in more detail below, an execution time indicator 372 is provided that is indicative of an estimated inspection program execution time for operating the CMM to execute a workpiece inspection program corresponding to the current workpiece feature inspection plan as executed by a current CMM configuration. A first set of operations is usable to edit the workpiece feature inspection plan, and the system is configured such that the execution time indicator 372 is automatically updated in response to a utilization of one of the first set of operations to modify the current workpiece feature inspection plan, so as to automatically indicate the estimated effect of the modification on the inspection program execution time.

The 3-D view portion 320 displays a 3-D view of the workpiece inspection program simulation portion 322 including workpiece features 326 on the workpiece 10' and an indication of inspection operations to be performed on the workpiece features 326 according to the current workpiece feature inspection plan. In the example of FIG. 3, the 3-D view shows a touch probe 21' having a stylus 21T', which is positioned relative to a workpiece 10'. In the state illustrated, the touch probe stylus 21T' is contacting a cylinder workpiece feature 326F8, which corresponds to the workpiece features 316F8 and 336F8 which are highlighted in the editable plan representations 314 and 334, respectively. In the editable plan representation 334 the workpiece feature 336F8 includes a description of "cylinder-1214" along with a displayed cylinder icon, and in the editable plan representation 314 the workpiece feature 316F8 includes a description of "1214" along with a displayed cylinder icon. Such descriptions and icons may be automatically generated and displayed as corresponding to a numbered designation and geometric type (e.g., cylinder, plane, sphere, cone, etc.) for each of the workpiece features.

The simulation status and control portion 380 may include a simulation status portion 381 and a simulation animation control portion 390. Using synchronization techniques outlined above, for example, the simulation status portion 381 may be configured to characterize a state of progress through the current workpiece feature inspection plan corresponding to a currently displayed 3-D view of the workpiece inspection program simulation portion 322. In various implementations, the simulation status portion 381 may include a current time indicator 382 that moves along a graphical total time range element 383 to characterize a state of progress through the current workpiece feature inspection plan corresponding to the currently displayed 3-D view, and the execution time indicator 372 may be displayed in association with the graphical total time range element 383. In one implementation, as illustrated in the example of FIG. 3, the execution time indicator 372 may be displayed in the vicinity of the right-hand end of the graphical total time range element 383.

In one implementation, the simulation status portion 381 may further include a current time display 384 displayed in the vicinity of at least one of the current time indicator 382 or the total time range element 383, and the current time display 384 may include a numerical time representation that is automatically updated corresponding to the current time indicator 382 or the currently displayed 3-D view, and that further characterizes the state of progress through the current workpiece feature inspection plan corresponding to the currently displayed 3-D view. In the example of FIG. 3, the current time display 384 indicates a time of "0:02:02" out of a total time indicated by the execution time indicator 372 of "0:18:06", and the current time indicator 382 is shown at a proportional position along the total time range element 383. This position of the current time indicator 382 and the time of the current time display 384 correspond to the current state of progress through the current workpiece feature inspection plan, which, relative to the editable plan representation 314, indicates that the workpiece feature 316F8 is being inspected after having completed the corresponding inspections of workpiece features 316F1-316F7. Correspondingly, relative to the editable plan representation 334 this indicates that the workpiece feature 336F8 is being inspected after having completed the corresponding inspections of workpiece features 336F1-336F7. In one implementation, the simulation animation control portion 390 may include elements that are usable to control an animated display of simulated progress through the current workpiece feature inspection plan as displayed in the 3-D view. For example, a start element 391, stop element 393, reverse element 395 and loop element 396 are illustrated in the simulation animation control portion 390, although it will be appreciated that in other implementations other elements (e.g., corresponding to pause, reset, increase speed, decrease speed, etc.) may also be included.

As will be described in more detail below, the editable plan representation 314 that is illustrated in FIGS. 3-10 includes forty-six workpiece features 316F1-316F46 on the workpiece 10' that may be inspected. The workpiece features 316F1-316F46 correspond to workpiece features 326F1-326F46 on the workpiece 10' in the workpiece inspection program simulation portion 322, and to workpiece features 336F1-336F46 in the editable plan representation 334. In order to simplify the figures, only some of the workpiece features are labeled. In the example of FIG. 3, the workpiece features 316F1-316F21 are currently visible in the plan view window 310, wherein a user may utilize controls to increment or scroll down (e.g., utilizing a vertical scroll bar 317, etc.) to view additional workpiece features (e.g., as will be illustrated and described in more detail below with respect to FIGS. 6 and 9). Similarly, a vertical scroll bar 337 may be used to scroll up and down the program view window 330.

With respect to the first set of operations that is usable to edit the workpiece feature inspection plan, in one implementation the editing user interface portion 312 may include workpiece feature exclusion/inclusion elements 318 (e.g., checkboxes next to each of the workpiece features 316) that operate to toggle between an exclusion state (e.g., with the associated box unchecked) and an inclusion state (e.g., with the associated box checked) for each associated workpiece feature 316. An exclusion state may correspond to an exclusion of the associated workpiece feature 316 from the set of workpiece features to be inspected, and an inclusion state may correspond to an inclusion of the associated workpiece feature 316 in the set of workpiece features to be inspected. In the example of FIG. 3, all of the workpiece features 316 have been selected for inclusion. In various implementations, the first set of operations may include a utilization of the workpiece feature exclusion/inclusion elements 318 to either exclude or include workpiece features 316 with respect to the set of workpiece features to be inspected, and the execution time indicator 372 may automatically be updated in response to a utilization of a workpiece feature exclusion/inclusion element 318, as will be described in more detail below with respect to FIGS. 4 and 5.

Figure 4:
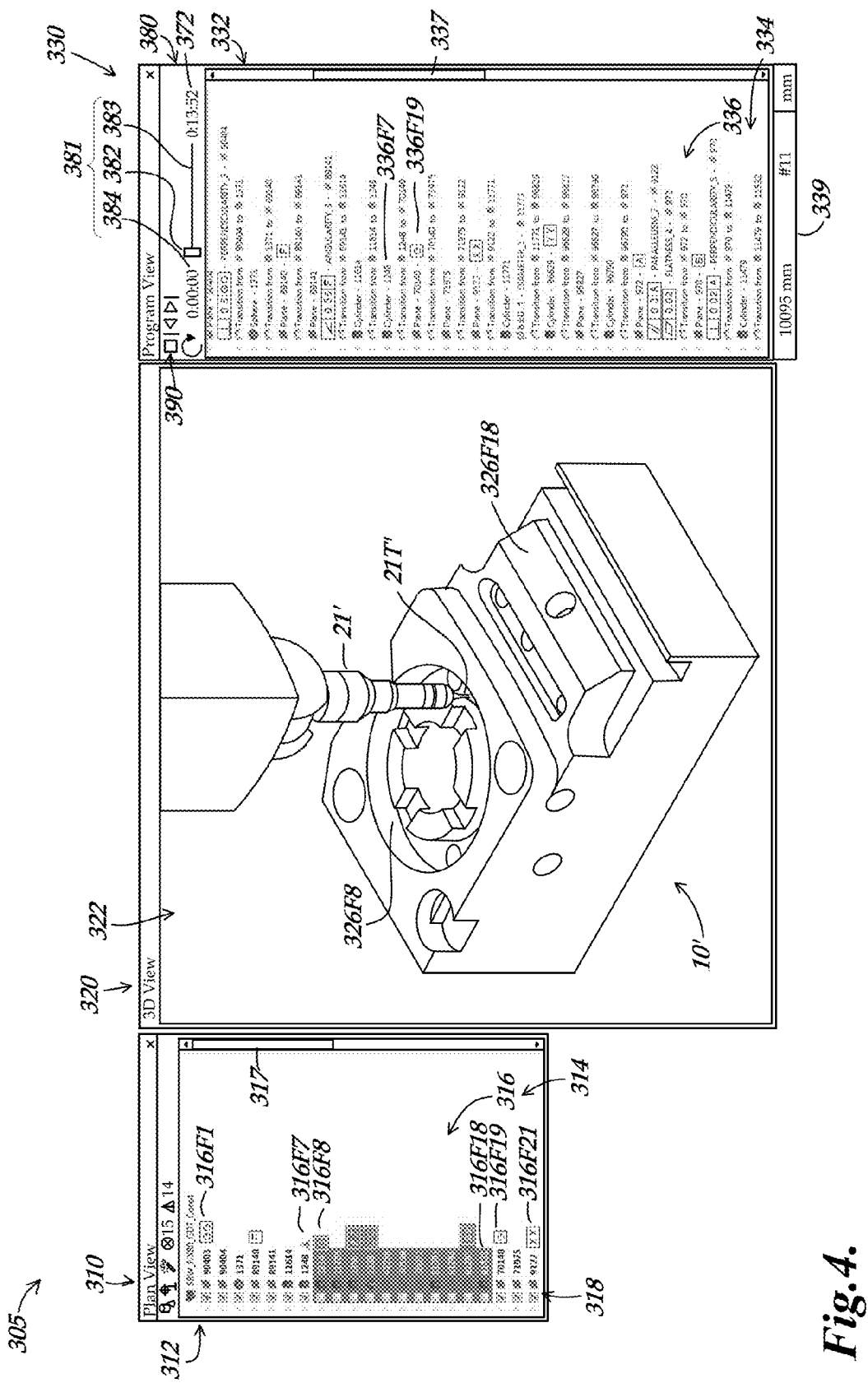
FIG. 4 is a diagram of a user interface in which some of the workpiece features of FIG. 3 have been unselected so as to be excluded from the set of workpiece features to be inspected according to the plan.

FIG. 4 is a diagram of the user interface 305 of FIG. 3 in which some of the workpiece features 316 have been unselected so as to be excluded from the set of workpiece features to be inspected. More specifically, as illustrated in FIG. 4, for the workpiece features 316F8-316F18, the corresponding workpiece feature exclusion/inclusion elements 318 have all been unchecked. As a result, the workpiece features 316F8-316F18 are no longer included in the set of workpiece features to be inspected. This is illustrated in the editable plan representation 334, for which the workpiece feature 336F7 is shown to be followed by the workpiece feature 336F19, with the workpiece features 336F8-336F18 no longer being included. This may be contrasted with the state of the editable plan representation 334 illustrated in FIG. 3, for which the workpiece feature 336F7 is shown to be followed by the workpiece feature 336F8, etc.

As a result of the unselecting of the workpiece features 316F8-316F18, in real time the exclusion time indicator 372 indicates a reduced time of "0:13:52", as compared to the previously indicated time of "0:18:06" of FIG. 3. This reduction in the displayed execution time indicates the estimated effect of the editing modification on the inspection program execution time. In this manner, real-time feedback related to the throughput effects of editing operations is provided in the editing environment such that a user may be made aware of the estimated effect of such modifications on the workpiece feature inspection plan. This may be useful for the user when determining tradeoffs between the thoroughness of inspection operations in comparison to the resulting throughput on an inspection machine, especially when inspections are automatically programmed based on the selected set of workpiece features. Such automatic programming operations may produce unexpected reductions or increases in inspection time (e.g., due to required probe or stylus change operations associated with a feature), and timely indication of such throughput effects may make inspection plan editing much more effective and efficient—particularly when it is displayed in a convenient and intuitive manner in the user interface. In contrast to embodiments within the scope of this disclosure, previously known CMM programming environments have not operated to determine the execution time effects of editing operations in a timely or real-time manner, or indicate those execution time effects in a user friendly and convenient manner in the user interface.

With respect to the 3-D view window 320, in various implementations, the highlighting of the workpiece features 316F8-316F18 in the editable plan representation 314 may correspondingly result in the workpiece features 326F8-326F18 also being highlighted or otherwise marked. In order to simplify the illustrations in FIG. 3, only the workpiece features 326F8 and 326F18 are labeled in the 3-D view window 320.

Figure 5:
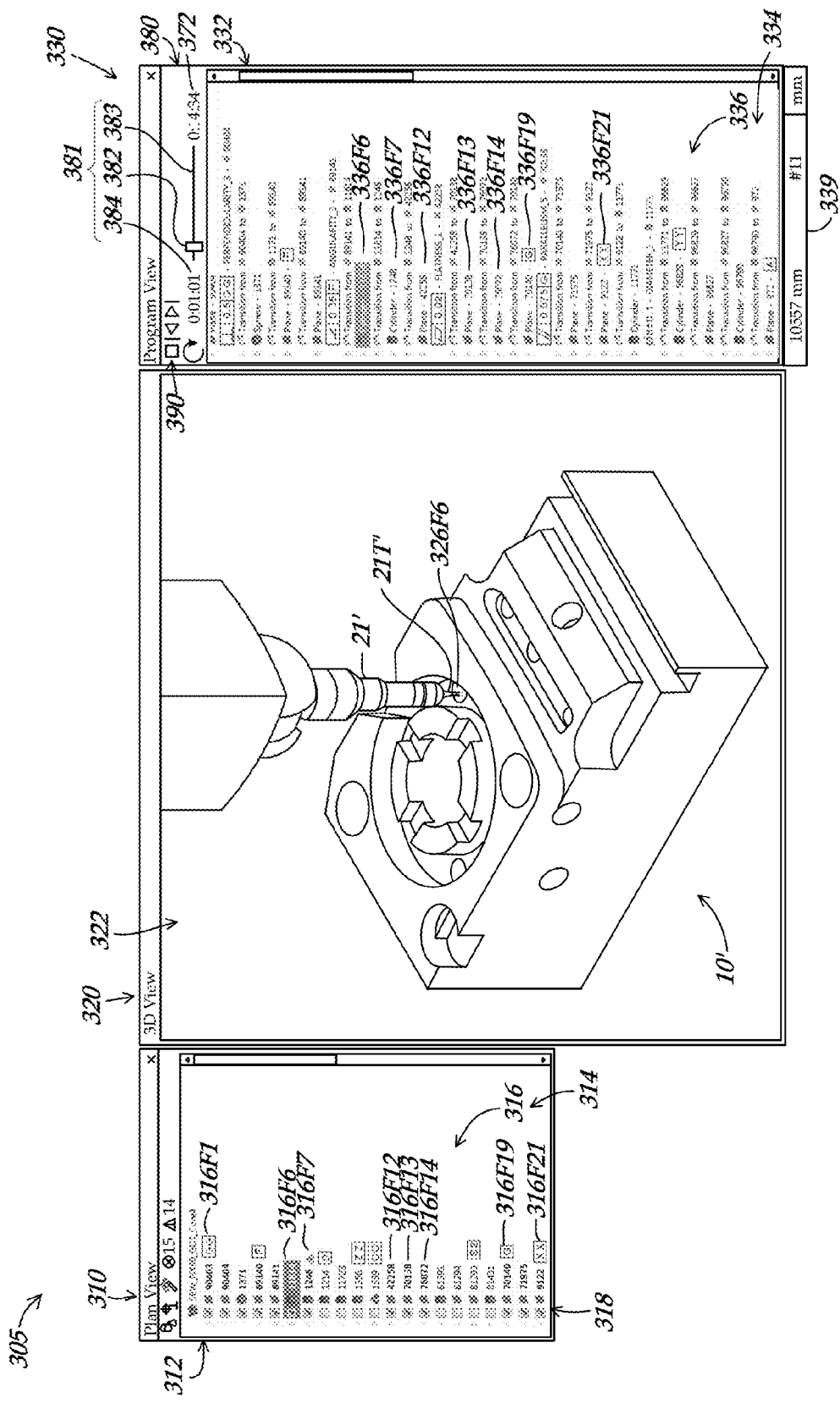
FIG. 5 is a diagram of a user interface in which some of the excluded workpiece features of FIG. 4 have been reselected so as to be reincluded in the set of workpiece features to be inspected according to the plan.

FIG. 5 is a diagram of the user interface 305 in which some of the excluded workpiece features 316 of FIG. 4 have been reselected so as to be reincluded in the set of workpiece features to be inspected. More specifically, as shown in FIG. 5, the workpiece features 316F12-316F14 are shown as having their corresponding workpiece feature exclusion/inclusion elements 318 rechecked so as to be reselected for inclusion in the set of workpiece features to be inspected. As a result, as illustrated in the editable plan representation 334, the workpiece feature 336F7 is now followed by the workpiece features 336F12-336F14, which are subsequently followed by the workpiece feature 336F19, etc. As a result of this modification, the execution time indicator 372 is shown to indicate a time of "0:14:34", which is an increase from the indicated time of "0:13:52" of FIG. 4, as corresponding to the additional time required for inspecting the workpiece features 336F12-336F14 as reincluded in the set of workpiece features to be inspected.

As also illustrated in FIG. 5, a cylinder workpiece feature is highlighted, as corresponding to the workpiece feature 316F6 of the editable plan representation 314, the workpiece feature 326F6 of the 3-D view window 320 and the workpiece feature 336F6 of the editable plan representation 334. The current time display 384 is shown to correspondingly indicate a time of "0:01:01" out of a total time indicated by the execution time indicator 372 of "0:14:34", and the current time indicator 382 is shown to be at a proportional position along the graphical total time range element 383. This indicates that the inspection of the workpiece feature 326F6 occurs approximately at the time "0:01:01" after the inspection of the workpiece features 326F1-326F5 has been completed.

In various implementations, as an alternative or in addition to the workpiece feature exclusion/inclusion elements 318 described above with respect to FIGS. 3-5, additional elements and/or commands may be provided. For example, the editing user interface portion 312 or 332 may include a delete command usable to delete a currently selected workpiece feature 316 or 336 from the set of workpiece features to be inspected. In such an implementation, the first set of operations may include a utilization of the delete command, and the execution time indicator 372 may automatically be updated in response to a utilization of the delete command. As another example, the editing user interface portion 312 or 332 may include an undo command usable to undo a previously executed operation. In such an implementation, the first set of operations may include a utilization of the undo command to undo a previously executed operation included in the first set of operations, and the execution time indicator 372 may automatically be updated in response to a utilization of the undo command.

Figure 6:
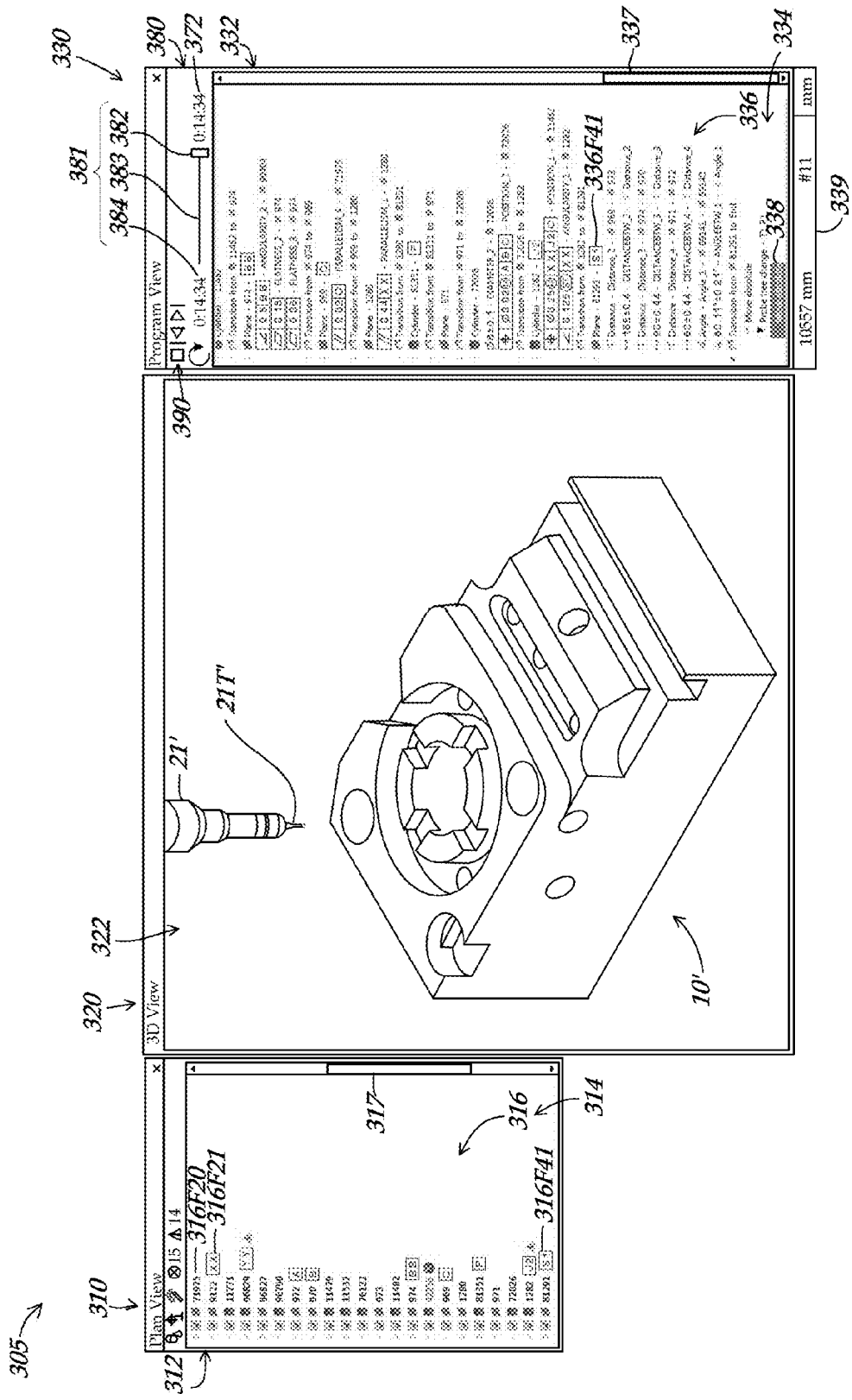
FIG. 6 is a diagram of a user interface displaying the end of a workpiece feature inspection plan.

FIG. 6 is a diagram of the user interface 305 displaying the end of the workpiece feature inspection plan. As shown in FIG. 6, the editable plan representation 334 shows a program element 338 (i.e., with a description of "move absolute") as being highlighted, which corresponds to the end of the workpiece feature inspection plan. The current time display 384 correspondingly indicates a time of "0:14:34" out of a total time indicated by the execution time indicator 372 of "0:14:34". The current time indicator 382 is correspondingly shown to be at the end of the graphical total time range element 383. In the 3-D view window 320, the probe 21 is shown as backed away from the workpiece 10', as may occur at the end of the workpiece feature inspection plan.

Figure 7:
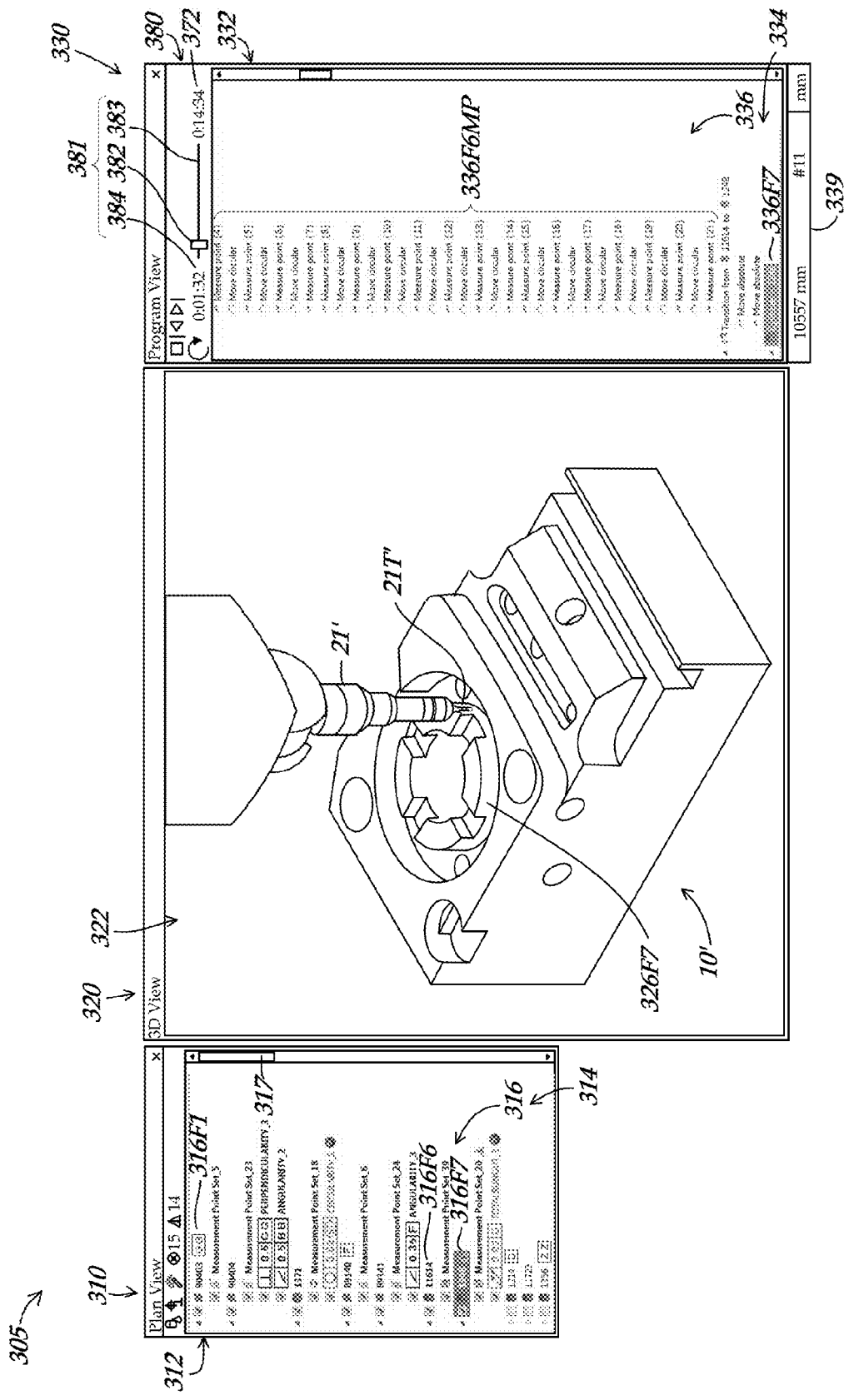
FIG. 7 is a diagram of a user interface in which additional detail is displayed regarding the editable plan representation and an example cylindrical workpiece feature is highlighted.

FIG. 7 is a diagram of the user interface 305 in which additional detail is displayed regarding the editable plan representations 314 and 334 and an example cylindrical workpiece feature is highlighted. As shown in FIG. 7, the additional detail for the editable plan representations 314 and 334 includes information about specific measurement points, movements, angles, etc., for the performance of the inspections of the designated workpiece features. For example, in the editable plan representation 334, a set of twenty-one measurement points 336F6MP is illustrated with respect to the inspection of the workpiece feature 336F6.

The highlighted cylindrical workpiece feature is shown to correspond to the workpiece feature 316F7 in the editable plan representation 314, the workpiece feature 326F7 in the 3-D view window 320, and the workpiece feature 336F7 in the editable plan representation 334. In various implementations, the corresponding measurement points or other inspection elements for a highlighted workpiece feature may be illustrated relative to the workpiece feature 326 in the 3-D view window 320. Corresponding to the highlighted workpiece feature 336F7, the current time display 384 is shown to indicate a time of "0:01:32" out of a total time indicated by the execution time indicator 372 of "0:14:34", and the current time indicator 382 is shown to be at a proportional position across the graphical total time range element 383. This indicates that the inspection of the workpiece feature 336F7 occurs approximately at the time "0:01:32", after the inspection of the workpiece features 336F1-336F6 has been completed.

Figure 8:
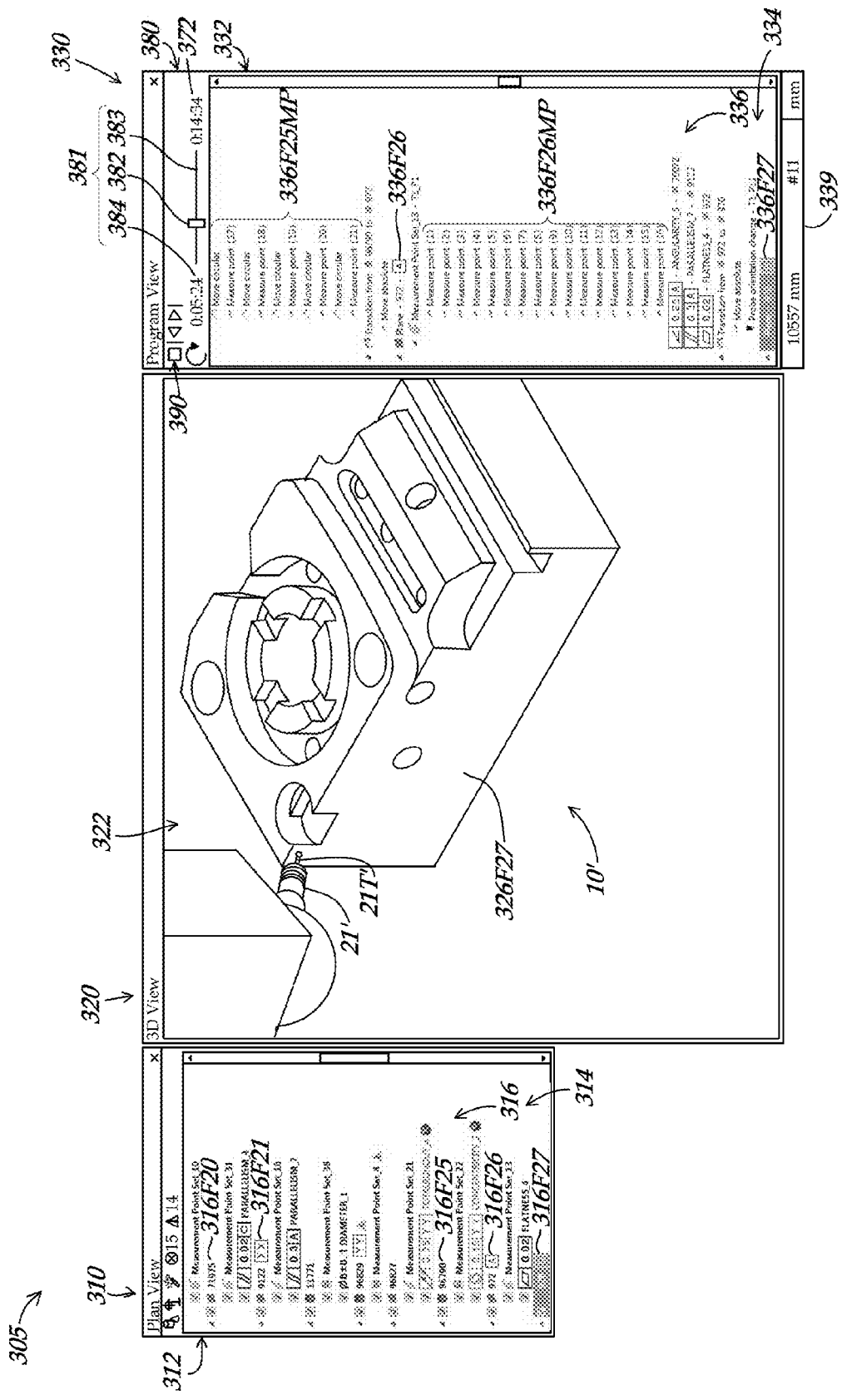
FIG. 8 is a diagram of a user interface in which additional detail is displayed regarding the editable plan representation and an example planar workpiece feature is highlighted.

FIG. 8 is a diagram of the user interface 305 in which an example plane workpiece feature has been highlighted. As shown in FIG. 8, the plane workpiece feature corresponds to the workpiece feature 316F27 in the editable plan representation 314, the workpiece feature 326F27 in the 3-D view window 320, and the workpiece feature 336F27 in the editable plan representation 334. In the 3-D view window 320, the probe 21' and stylus 21T' are illustrated as positioned for beginning the inspection of the plane workpiece feature 326F27. The current time display 384 is shown to correspondingly indicate a time of "0:05:24" out of a total time indicated by the execution time indicator 372 of "0:14:34", and the current time indicator 382 is shown at a proportional position along the graphical total time range element 383. This indicates that the inspection of the workpiece feature 336F27 occurs approximately at the time "0:05:24", after the inspection of the previous workpiece features has been completed.

Figure 9:
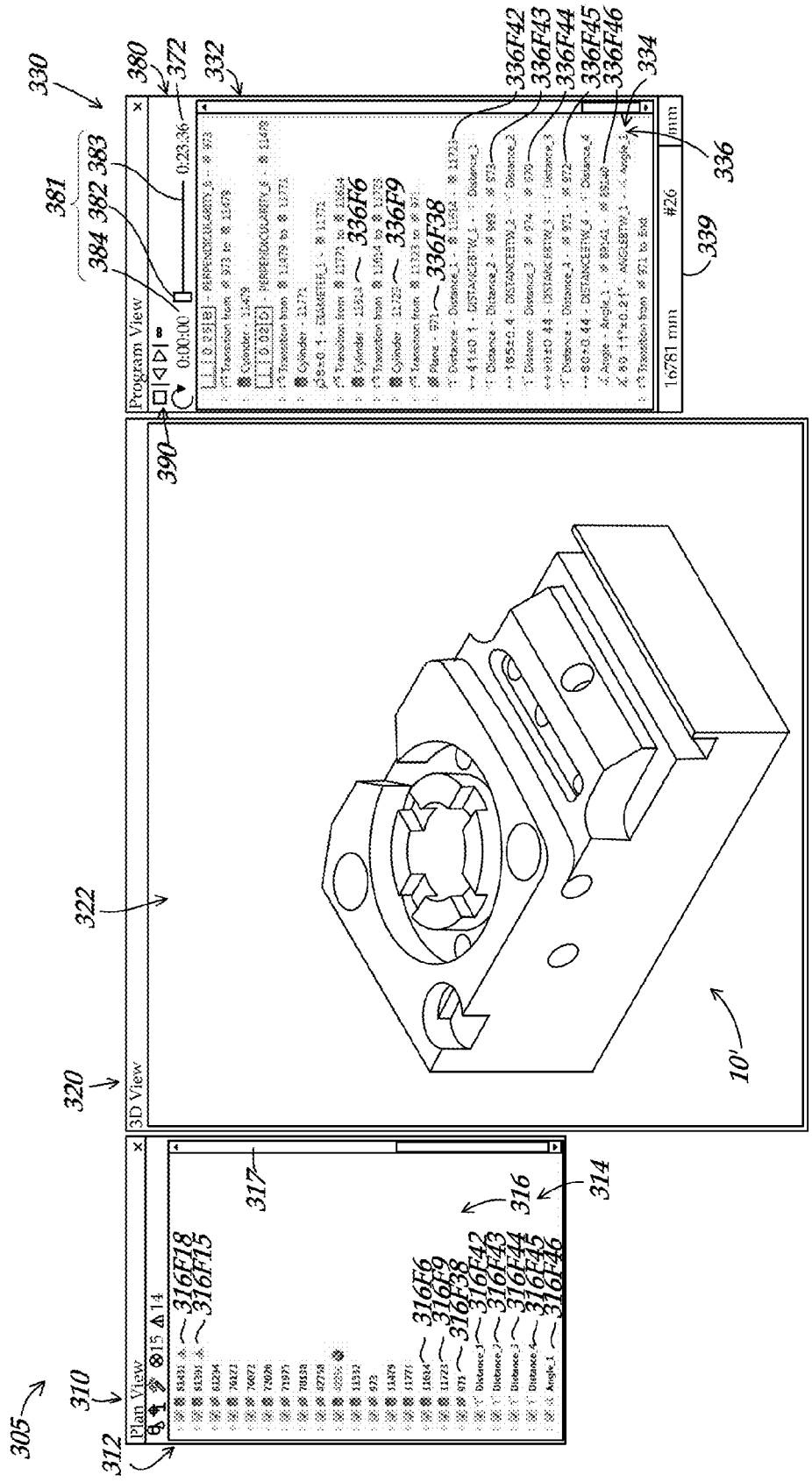
FIG. 9 is a diagram of a user interface illustrating a state of the editable plan representation prior to a sequence editing operation being performed.
Figure 10:
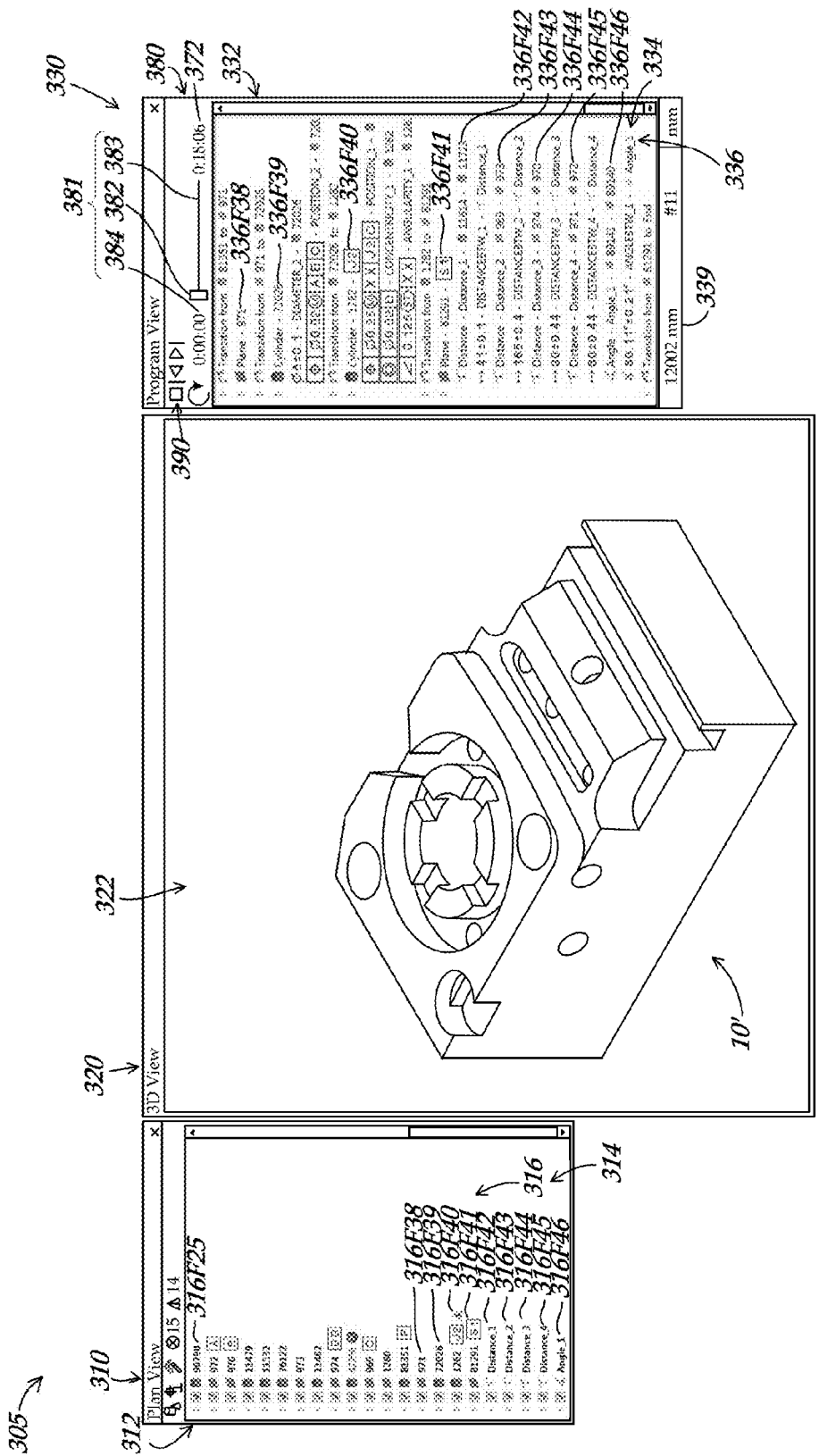
FIG. 10 is a diagram of a user interface illustrating a state of the editable plan representation after performing a sequence editing operation.

FIGS. 9 and 10 are diagrams of the user interface 305 illustrating a state of the editable plan representations 314 and 334 before and after one or more sequence editing operations have been performed, respectively. As shown in FIG. 9, the workpiece features included in the editable plan representations 314 and 334 are shown in a different order than has previously been illustrated and described with respect to FIGS. 3-8. The state of FIG. 9 generally corresponds to a time before one or more sequence editing operations have been performed to improve the efficiency for operating the CMM to execute the workpiece inspection program corresponding to the current workpiece feature inspection plan. The different order of the workpiece features in the editable plan representation 314 is illustrated in part by the workpiece feature 316F6 being followed by the workpiece feature 316F9, which is followed by the workpiece feature 316F38, which is followed by a final group of workpiece features 316F42-316F46 that are measured at the end of the workpiece inspection program. Correspondingly, in the editable plan representation 334, the workpiece feature 336F6 is followed by the workpiece feature 336F9, which is followed by the workpiece feature 336F38, which is followed by the final group of workpiece features 336F42-336F46. For the illustrated state of the editable plan representations 314 and 334, the execution time indicator 372 is shown to indicate a total execution time of "0:23:36".

In contrast, as shown in FIG. 10, after the one or more sequence editing operations have been performed, the execution time indicator 372 is shown to indicate a reduced total execution time of "0:18:06". This corresponds to the inspection of the workpiece features being placed in a more efficient order, and may also correspond to a change in the CMM configuration, as will be described in more detail below. As shown in FIG. 10, the editable plan representation 314 and the editable plan representation 334 include the workpiece features that are to be inspected in the same order in which they were previously illustrated and described with respect to FIGS. 3-8. This order is correspondingly more efficient than the order illustrated in FIG. 9. A tracking area 339 at the bottom of the program view window 330 may also include data such as a number of probe changes as corresponding to the execution of the workpiece inspection program as executed by a current CMM configuration. In one implementation, the number of probe changes illustrated in the state of FIG. 9 is shown to be "26" while the number of probe changes in the state of FIG. 10 is reduced to "11", which may further contribute to the reduction in the total execution time as indicated by the execution time indicator 372.

In one implementation, the editing user interface portion 312 or 332 may include workpiece feature sequence editing features usable to alter an inspection sequence of the set of workpiece features to be inspected, as described above with respect to FIGS. 9 and 10. In such an implementation, the first set of operations may include a utilization of a workpiece feature sequence editing feature to alter the inspection sequence, and the execution time indicator 372 may automatically be updated in response to a utilization of the workpiece feature sequence editing feature. Different types of workpiece feature sequence editing features may be provided. For example, one type may include dragging a workpiece feature 316 or 336 to a new position in a displayed sequence of the editable set of workpiece features to be inspected. Another type may include cutting and pasting a workpiece feature 316 or 336 to a new position in a displayed sequence of the editable set of workpiece features to be inspected. Another type may include utilizing an execution time reducing command that automatically re-sequences the inspection sequence of the set of workpiece features to be inspected so as to reduce the execution time.

In one implementation, the user interface may include a CMM definition portion usable to define or revise the current CMM configuration. In such an implementation, the first set of operations may include a utilization of the CMM definition portion to revise the current CMM configuration, and the execution time indicator may automatically be updated in response to a utilization of the CMM definition portion to revise the current CMM configuration. The revised current CMM configuration may include at least one of: a revised configuration of at least one sensor; a revised model or type of CMM machine; or a revised motion control parameter used by the CMM control portion.

Figure 11:
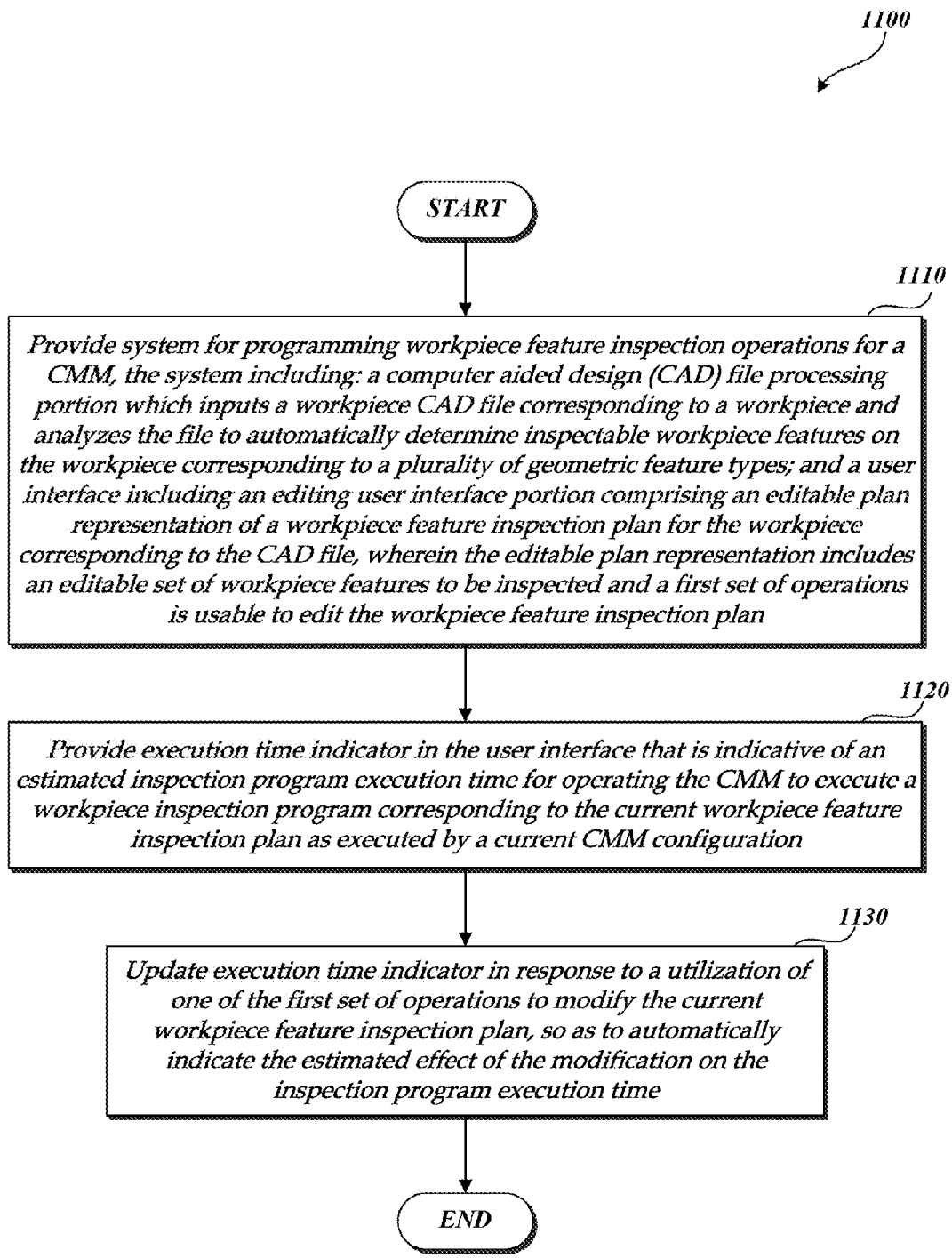
FIG. 11 is a flow diagram illustrating one exemplary implementation of a routine for operating a user interface with real-time feedback related to throughput.

FIG. 11 is a flow diagram illustrating one exemplary implementation of a routine 1100 for operating a user interface with real-time feedback related to throughput. At a block 1110, a system is provided for programming workpiece feature inspection operations for a CMM, the system including: a computer-aided design (CAD) file processing portion which inputs a workpiece CAD file corresponding to a workpiece and analyzes the file to automatically determine inspectable workpiece features on the workpiece corresponding to a plurality of geometric feature types; and a user interface including an editing user interface portion comprising an editable plan representation of a workpiece feature inspection plan for the workpiece corresponding to the CAD file, wherein the editable plan representation includes an editable set of workpiece features to be inspected and a first set of operations is usable to edit the workpiece feature inspection plan.

At a block 1120, an execution time indicator is provided in the user interface that is indicative of an estimated inspection program execution time for operating the CMM to execute a workpiece inspection program corresponding to the current workpiece feature inspection plan as executed by a current CMM configuration. At a block 1130, the execution time indicator is updated in response to a utilization of one of the first set of operations to modify the current workpiece feature inspection plan, so as to automatically indicate the estimated effect of the modification on the inspection program execution time.

Figure 12:
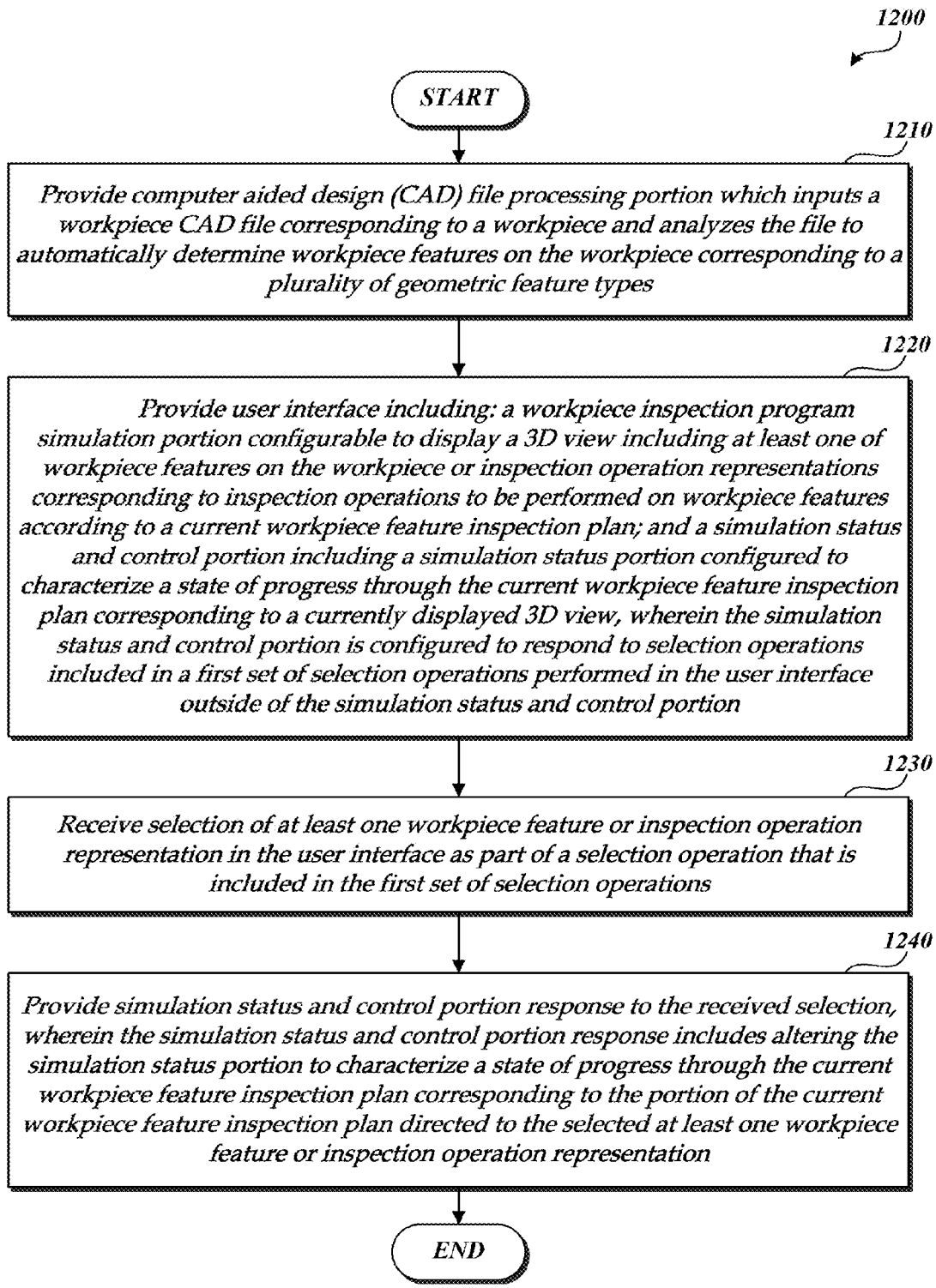
FIG. 12 is a flow diagram illustrating one exemplary implementation of a routine for operating a user interface with simulation status and control responsive to selection operations.

FIG. 12 is a flow diagram illustrating one exemplary implementation of a routine 1200 for operating a user interface with a simulation status and control portion that is responsive to selection operations. At a block 1210, a computer-aided design (CAD) file processing portion is provided which inputs a workpiece CAD file corresponding to a workpiece and analyzes the file to automatically determine inspectable workpiece features on the workpiece corresponding to a plurality of geometric feature types. At a block 1220, a user interface is provided including a workpiece inspection program simulation portion and a simulation status and control portion. The workpiece inspection program simulation portion is configurable to display a 3-D view including at least one of workpiece features on the workpiece or inspection operation representations corresponding to inspection operations to be performed on workpiece features according to a current workpiece feature inspection plan. The simulation status and control portion includes a simulation status portion configured to characterize a state of progress through the current workpiece feature inspection plan corresponding to a currently displayed 3-D view. In addition, the simulation status and control portion is configured to respond to selection operations included in a first set of selection operations performed in the user interface outside of the simulation status and control portion.

At a block 1230, a selection is received of at least one workpiece feature or inspection operation representation in the user interface as part of a selection operation that is included in the first set of selection operations. At a block 1240, a simulation status and control portion response is provided to the received selection. In various implementations, the simulation status and control portion response includes altering the simulation status portion to characterize a state of progress through the current workpiece feature inspection plan corresponding to the portion of the current workpiece feature inspection plan directed to the selected at least one workpiece feature or inspection operation representation. For example, as described above with respect to FIGS. 3-10, a simulation status portion 381 may include a current time indicator 382 that moves along a graphical total time range element 383 to characterize a state of progress through a current workpiece feature inspection plan corresponding to a currently displayed 3-D view (e.g., in a 3-D view window 320), and the altering of the simulation status portion 381 to characterize a state of progress may include altering the position of the current time indicator 382 along the graphical total time range element 383. As will be described in more detail below with respect to FIG. 14, the position of the current time indicator 382 along the graphical total time range element 383 may also be directly adjustable by a user, and when the position of the current time indicator 382 is adjusted, the currently displayed 3-D view (e.g., in the 3-D view window 320) may be altered to correspond to the state of progress through the current workpiece feature inspection plan that is indicated by the position of the current time indicator 382. As also described above, the simulation status portion 381 may further include a current time display 384 that may consist of a numerical time representation that characterizes the state of progress through the current workpiece feature inspection plan corresponding to the currently displayed 3-D view, for which the altering of the simulation status portion to characterize a state of progress may also or alternatively include altering the numerical time representation.

Figure 13:
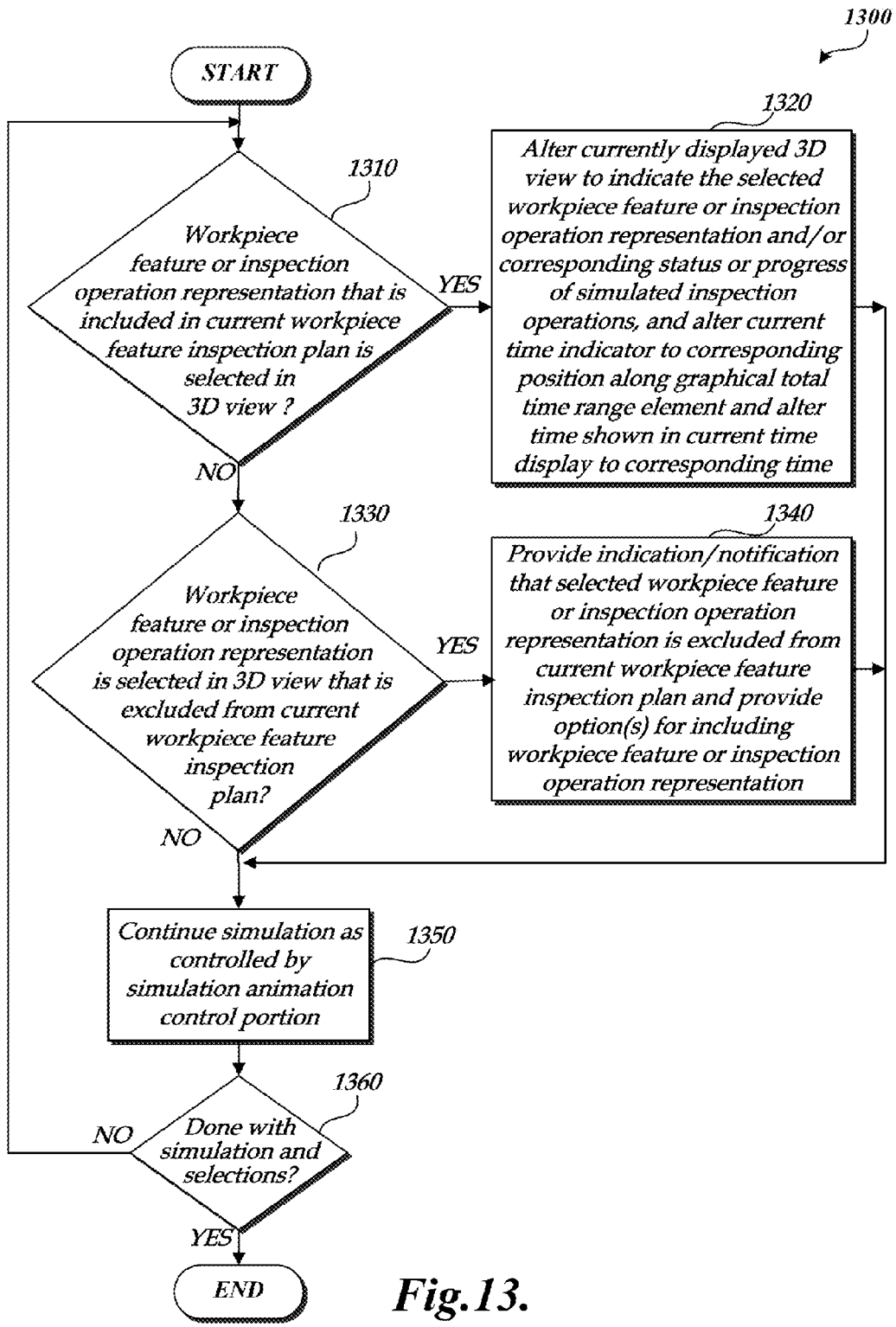
FIG. 13 is a flow diagram illustrating one exemplary implementation of a routine for selection operations performed in a 3-D view.

FIG. 13 is a flow diagram illustrating one exemplary implementation of a routine 1300 for selection operations performed in a 3-D view. At a decision block 1310, a determination is made as to whether a workpiece feature or inspection operation representation has been selected in the 3-D view that is included in a current workpiece feature inspection plan. In various implementations, the selection operation may include a positioning of a selector element (e.g., a mouse cursor) proximate to a workpiece feature or inspection operation representation in the 3-D view, and a performance of a selection action for selecting the workpiece feature or inspection operation representation. For example, with respect to the 3-D window 320 of FIGS. 3-10 that may be provided on a display (e.g., the display unit 5D of FIG. 1), a user may utilize a mouse or other input device to position a selector element (e.g., a movable pointer, cursor, highlighted area, finger on a touch screen, etc.) over a workpiece feature or inspection operation, and may select the workpiece feature or inspection operation representation through a performance of a selection action (e.g., pressing a key, button, mouse, pushing a finger on a touch screen, etc.). As another example, in a holographic three-dimensional view, the selector element may include an element such as a pointer or the user's finger, and the selector element may be used to perform a selection action (e.g., the user making a particular type of motion with the selector element for making a selection).

If a selected workpiece feature or inspection operation representation is included in the current workpiece feature inspection plan, then at a block 1320 the currently displayed 3-D view is altered to indicate the selected workpiece feature or inspection operation representation (e.g., by highlighting a workpiece feature operation representation with a different color or pattern, and/or "touching" it with a displayed touch probe, or the like) and the position of a current time indicator is altered to a corresponding position along a graphical total time range element and a time shown in a current time display is altered to a corresponding time. Various examples of selection operations may be described with respect to FIGS. 3-10. As a first specific example utilizing FIGS. 3 and 10, as shown in FIG. 10 a sequence editing operation has recently been performed and no workpiece feature or inspection operation representation has yet been selected. The state of FIG. 3 may then be reached by a user making a selection of the cylinder workpiece feature 326F8 in the 3-D view window 320. As shown in FIG. 3, the currently displayed 3-D view (i.e., in the 3-D view window 320) has been altered to indicate the selected workpiece feature or inspection operation representation and/or show the corresponding status or progress of simulated inspection operations corresponding to the portion of the current workpiece feature inspection plan that is directed to the selected workpiece feature 326F8. More specifically, in this example, the touch probe stylus 21T' is illustrated as having been moved to a position where it is contacting the workpiece feature 326F8, where inspection operations (e.g., for determining measurement points) may be performed on the workpiece feature 326F8. Correspondingly, the current time display 384 has been altered to show a time of "0:02:02" that corresponds to the time during the current workpiece feature inspection plan when the inspection of the cylinder workpiece feature 326F8 will be performed, and which is out of a total time indicated by the execution time indicator 372 of "0:18:06", and the current time indicator 382 is shown to have been moved to a proportional position along the graphical total time range element 383. In this manner, the position of the current time indicator 382 along the graphical total time range element 383, and the time shown in the current time display 384, have each been altered so as to characterize a state of progress through the current workpiece feature inspection plan that corresponds to the portion of the current workpiece feature inspection plan directed to the workpiece feature 326F8 that has been selected by a user in the 3-D view window 320.

As a second specific example utilizing FIGS. 5, 7 and 8, in FIG. 5, a user has made a selection of the workpiece feature 326F6 in the 3-D view window 320. The current time display 384 shows a time of "0:01:01" (i.e., corresponding to a time during the current workpiece feature inspection plan when the workpiece feature 326F6 is being inspected) which is out of a total time indicated by the execution time indicator 372 of "0:14:34", and the current time indicator 382 is shown at a proportional position along the graphical total time range element 383. A user may subsequently make a selection in the 3-D view window 320 of a next workpiece feature 326F7, so as to reach the state illustrated in FIG. 7. As shown in FIG. 7, the 3-D view window 320 has been altered to indicate the selected workpiece feature or inspection operation representation and/or show the corresponding status or progress of simulated inspection operations corresponding to the portion of the current workpiece feature inspection plan that is directed to the workpiece feature 326F7 (i.e., the touch probe stylus 21T' is illustrated as positioned for the beginning of the inspection of the cylinder workpiece feature 326F7). The current time display 384 is shown to have been altered to indicate a time of "0:01:32" (i.e., corresponding to the time during the current workpiece feature inspection plan when the workpiece feature 326F7 is being inspected), which is out of a total time indicated by the execution time indicator 372 of "0:14:34", and the position of the current time indicator 382 is shown to have been altered to be at a proportional position along the graphical total time range element 383.

Similarly, from the state of FIG. 7, a user may make a subsequent selection of another workpiece feature 326F27 in the 3-D view window 320, so as to reach the state of FIG. 8. As shown in FIG. 8, the 3-D view window 320 has been altered so as to indicate the selected workpiece feature or inspection operation representation and/or show the corresponding status or progress of simulated inspection operations corresponding to the portion of the current workpiece feature inspection plan that is directed to the workpiece feature 326F27 (i.e., the touch probe stylus 21T' is illustrated as positioned for beginning the inspection of the plane workpiece feature 326F27). The current time display 384 is shown to have been altered to indicate a time of "0:05:24" (i.e., corresponding to the time during the current workpiece feature inspection plan when the workpiece feature 326F27 is being inspected), which is out of a total time indicated by the execution time indicator 372 of "0:14:34", and the position of the current time indicator 382 is shown to have been altered to be at a proportional position along the graphical total time range element 383.

In this second specific example, FIGS. 7 and 8 also illustrate certain types of inspection operation representations, wherein the inspection operation representations may be displayed and/or selected in addition or as an alternative to the workpiece features. More specifically, as shown in FIGS. 7 and 8, the editable plan representations 314 and 334 include information about specific measurement points, movements, angles, etc. (e.g., which may be included as types of inspection operation representations), for the performance of the inspections of the designated workpiece features. For example, in the editable plan representation 334 of FIG. 7, a set of 21 measurement points 336F6MP (e.g., which collectively or individually may be inspection operation representations) is illustrated with respect to the inspection of the workpiece feature 336F6. In various implementations, such measurement points, movements, angles, etc., may be graphically illustrated in the 3-D view window 320 as proximate to the related workpiece features (e.g., illustrated as widgets, dots, angle and/or movement symbols in the 3-D representation, etc.), and in such a configuration may be selectable by a user in a manner similar to how the workpiece features 326 are selectable.

Returning to FIG. 13, at a decision block 1330, a determination is made as to whether a workpiece feature or inspection operation representation has been selected in the 3-D view that is excluded from the current workpiece feature inspection plan. If a selected workpiece feature or inspection operation representation is excluded from the current workpiece feature inspection plan, then at a block 1340 an indication/notification is provided that the selected workpiece feature or inspection operation representation is excluded from current workpiece feature inspection plan and option(s) may be provided for including the selected workpiece feature or inspection operation representation. An example of a selection of a workpiece feature that is excluded from a current workpiece feature inspection plan may be described with respect to FIG. 4. In FIG. 4, a number of workpiece features (i.e., workpiece features 316F8-316F18) have been excluded from the current workpiece feature inspection plan. A user may subsequently select one of the excluded workpiece features in the 3-D view window 320 (e.g., the workpiece feature 326F8, the workpiece feature 326F18, etc.). In one specific example implementation, as a result of a selection of an excluded workpiece feature, the current time display 384 may be made to indicate a time of "0:00:00", and the current time indicator 382 may correspondingly be positioned at the beginning of the total time range element 383, both of which may provide an indication that the selected workpiece feature is excluded from the current workpiece feature inspection plan. In addition, when a user selects an excluded workpiece feature in the 3-D view window 320, the editable plan representation 314 in the plan view window 310 may be made to show the selected workpiece feature in a highlighted state, along with the workpiece feature exclusion/inclusion element 318 being unchecked, so as to indicate an option for including the workpiece feature in the current workpiece feature inspection plan (e.g., by selecting the corresponding workpiece feature exclusion/inclusion element 318 so as to toggle to the inclusion state for which the associated box will be checked).

Returning to FIG. 13, at a block 1350, the simulation or animation including the display of the progress of the workpiece feature inspection plan in the 3-D view is continued as controlled by a simulation animation control portion. Examples of controlling operations of a simulation animation control portion are described in more detail below with respect to FIG. 15. It will be appreciated that if operations of the block 1350 are reached based on completion of operations of the block 1320, then the current status of the 3-D view and the status of the simulation status and control portion correspond to the recently selected element in the 3-D view, as indicated above in the description of the block 1320. Therefore, in such a case, according to principles disclosed herein, activating a "play" or "go" element of the simulation animation control portion (in the absence of any further status adjustment) will activate the simulation animation to continue from its current status (that is corresponding to feature or operation selected at the block 1310). At a decision block 1360, a determination is made as to whether the simulation and/or any selections of workpiece features or inspection operation representations are complete (e.g., as indicated by the simulation reaching its end, by a user selection for ending the simulation and/or any further selections of workpiece feature or inspection operation representations, etc.). If the user is not done with the simulation and/or any further selections of workpiece features or inspection operation representations, the routine returns to block 1310, otherwise the routine ends.

Figure 14:
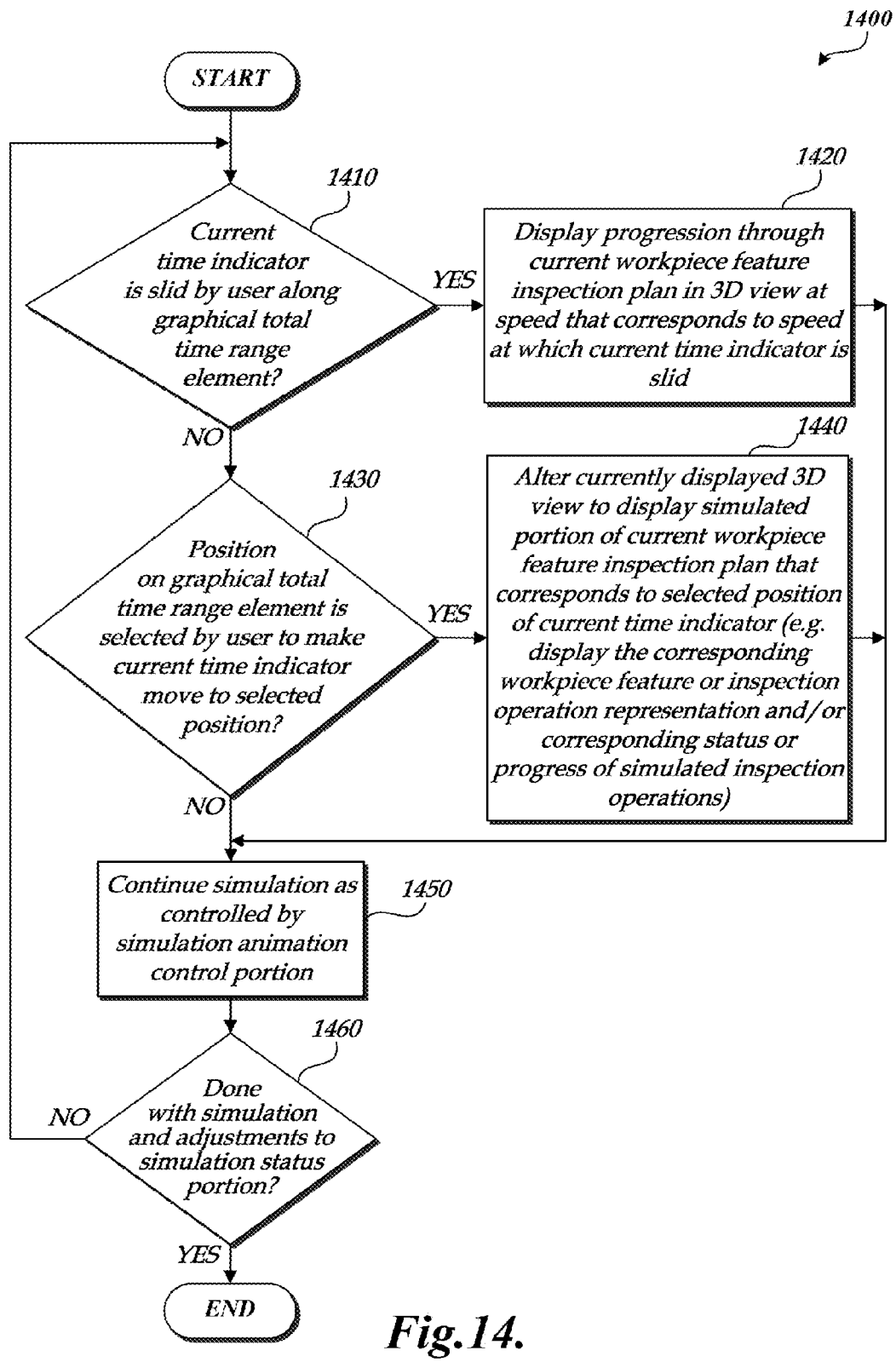
FIG. 14 is a flow diagram illustrating one exemplary implementation of a routine for adjusting a simulation status portion.

FIG. 14 is a flow diagram illustrating one exemplary implementation of a routine 1400 for adjusting a simulation status portion. As described above, in addition to the simulation status portion being utilized to characterize a state of progress through the current workpiece feature inspection plan, the simulation status portion may also be directly adjustable by a user. As shown in FIG. 14, at a decision block 1410, a determination is made as to whether the current time indicator is being slid by a user along the graphical total time range element. If it is determined that the current time indicator is being slid by the user, then at a block 1420 a progression through the current workpiece feature inspection plan is displayed in the 3-D view at a speed that corresponds to the speed at which current time indicator is being slid.

At a decision block 1430, a determination is made as to whether a position on the graphical total time range element has been selected by a user in order to make the current time indicator move to the selected position. If it is determined that a position on the graphical total time range element has been selected by a user, then at a block 1440 the currently displayed 3-D view is altered to display the portion of the current workpiece feature inspection plan that corresponds to the selected position of current time indicator (e.g., display the corresponding workpiece feature or inspection operation representation and/or corresponding status or progress of simulated inspection operations). At a block 1450, the simulation in the 3-D view is continued as controlled by the simulation animation control portion. Examples of controlling operations of a simulation animation control portion are described in more detail below with respect to FIG. 15. It will be appreciated that operations of the block 1450 are reached based on completion of operations of the block 1420 or 1440. Therefore, the current status of the 3-D view and the simulation status and control portion corresponds to those completed operations. In such a case, according to principles disclosed herein, activating a "play" or "go" element of the simulation animation control portion (in the absence of any further status adjustment) will activate the simulation animation to continue from its current status as determined by those operations. At a decision block 1460, a determination is made as to whether the simulation and/or any adjustments to the simulation status portion are complete (e.g., as indicated by the simulation reaching its end, by a user selection for ending the simulation and/or any further adjustments to the simulation status portion, etc.). If the user is not done with the simulation and/or any adjustments to the simulation status portion, the routine returns to the block 1410, otherwise the routine ends.

Figure 15:
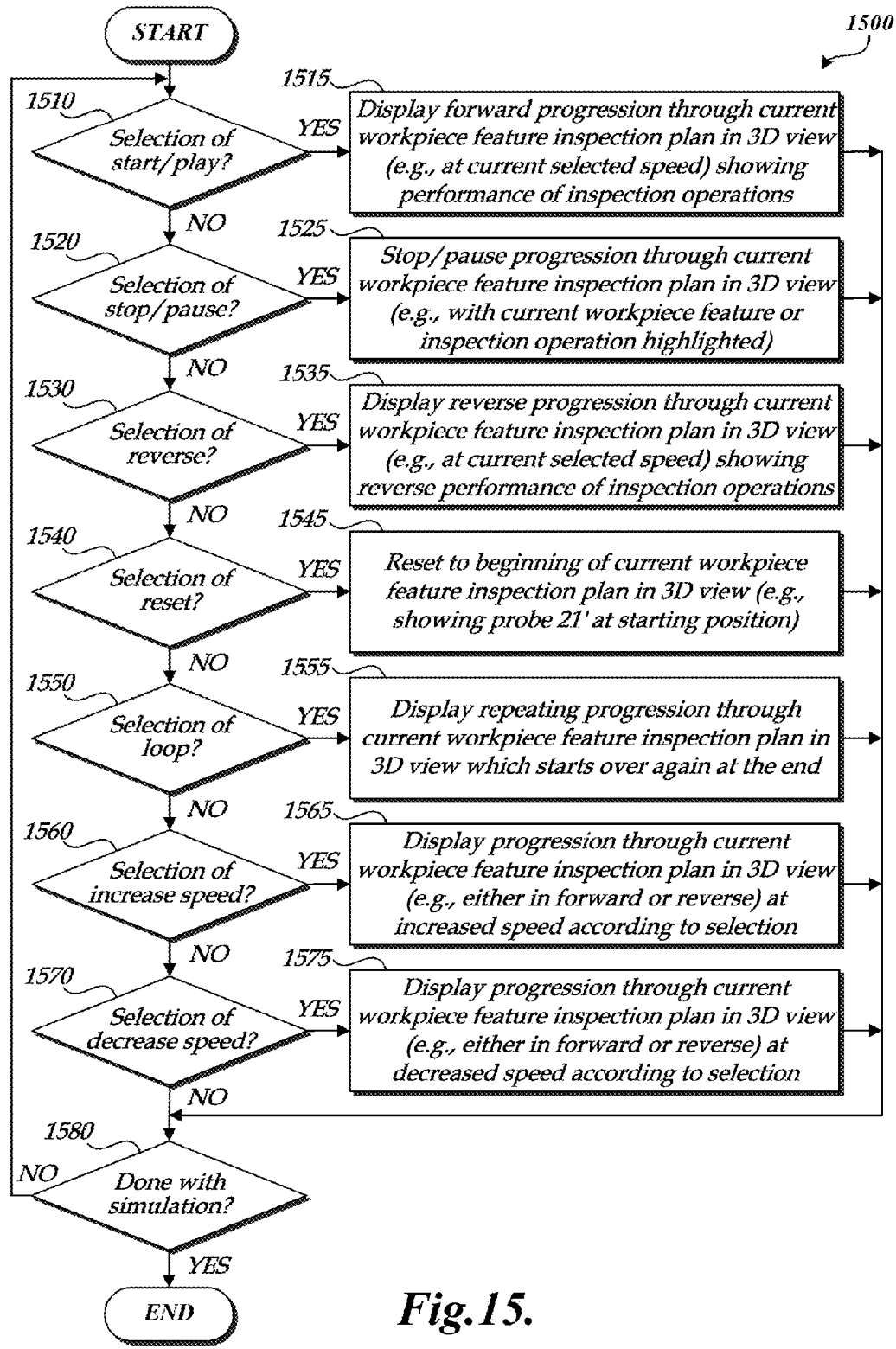
FIG. 15 is a flow diagram illustrating one exemplary implementation of a routine for utilizing a simulation animation control portion.

FIG. 15 is a flow diagram illustrating one exemplary implementation of a routine 1500 for utilizing a simulation animation control portion. As described above with respect to FIGS. 2B and 3-10, the simulation status and control portion 280 or 380 may include a simulation animation control portion 290 or 390, including at least one element that is usable to control at least one aspect of an animated display of simulated progress through the current workpiece feature inspection plan as displayed in the 3-D view. As shown in FIG. 15, at a decision block 1510, a determination is made as to whether a user has made a selection of start/play. If it is determined that the user has made a selection of start/play, then at a block 1515 a forward progression through the current workpiece feature inspection plan is displayed in the 3-D view (e.g., at a current selected speed). At a decision block 1520, a determination is made as to whether a user has made a selection of stop/pause. If it is determined that the user has made a selection of stop/pause, then at a block 1525 the progression through the current workpiece feature inspection plan in the 3-D view is stopped/paused (e.g., with a current workpiece feature or inspection operation highlighted or otherwise indicated).

At a decision block 1530, a determination is made as to whether a user has made a selection of reverse. If it is determined that the user has made a selection of reverse, then at a block 1535 a reverse progression through the current workpiece feature inspection plan is displayed in the 3-D view (e.g., at current selected speed), showing a reverse performance of the inspection operations. At a decision block 1540, a determination is made as to whether a user has made a selection of reset. If it is determined that the user has made a selection of reset, then at a block 1545 a reset is made to the beginning of the current workpiece feature inspection plan in the 3-D view (e.g., showing the probe 21' at a starting position which may be backed away from the workpiece).

At a decision block 1550, a determination is made as to whether a user has made a selection of a loop. If it is determined that the user has made a selection of a loop, then at a block 1555 a repeating progression through the current workpiece feature inspection plan is displayed in the 3-D view (e.g., which starts over again at the end of the workpiece feature inspection plan). At a decision block 1560, a determination is made as to whether a user has made a selection of increase speed. If it is determined that the user has made a selection of increase speed, then at a block 1565 the progression through the current workpiece feature inspection plan is displayed in the 3-D view (e.g., either in forward or reverse) at an increased speed according to the selection.

At a decision block 1570, a determination is made as to whether a user has made a selection of decrease speed. If it is determined that the user has made a selection of decrease speed, then at a block 1575 the progression through current workpiece feature inspection plan is displayed in the 3-D view (e.g., either in forward or reverse) at a decreased speed according to the selection. At a decision block 1580, a determination is made as to whether a user is done with the simulation (e.g., as indicated by a user selection for ending the simulation). If it is determined that the user is not done, the routine returns to the block 1510, otherwise the routine ends.

Figure 16:
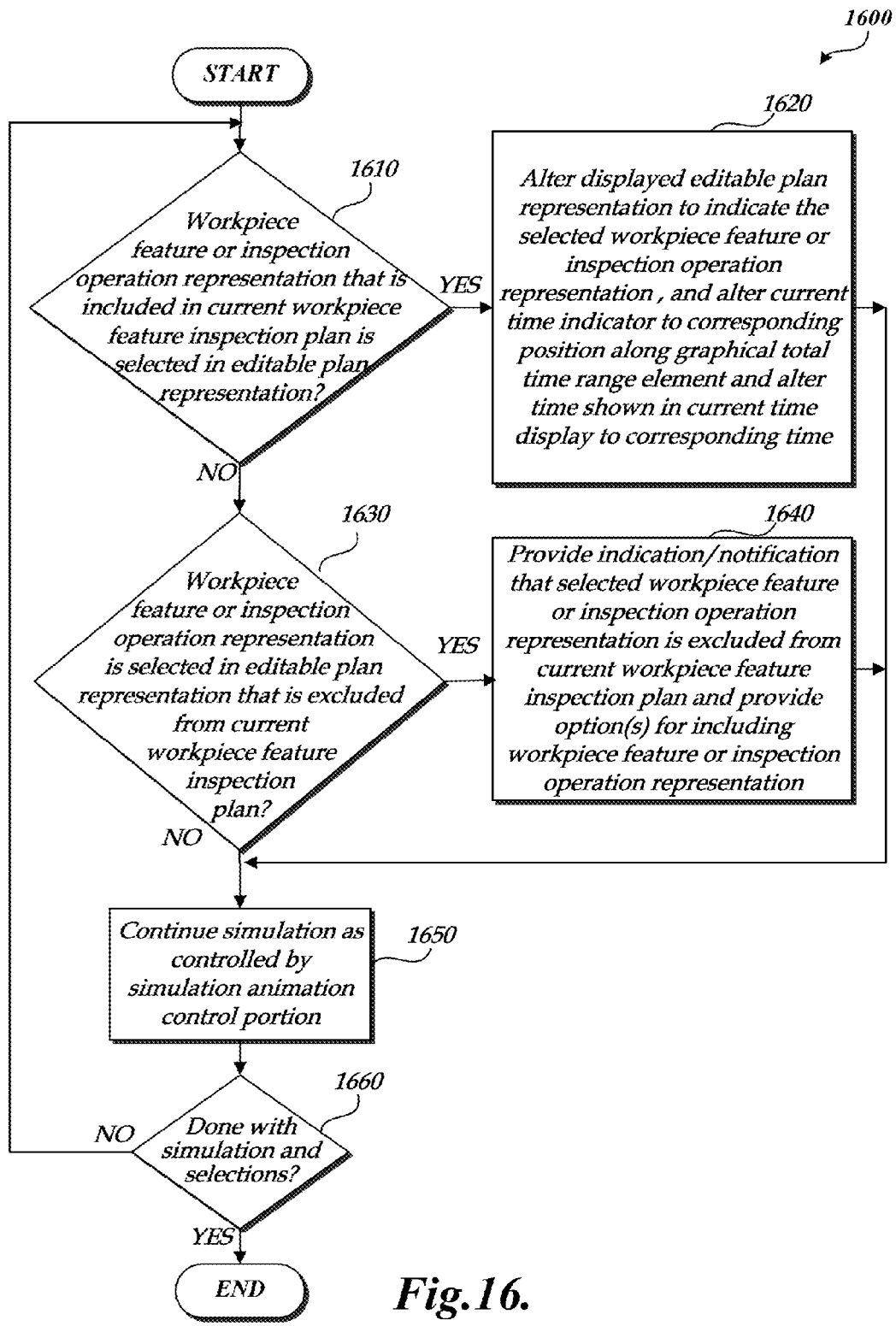
FIG. 16 is a flow diagram illustrating one exemplary implementation of a routine for selection operations performed in an editable plan representation.

FIG. 16 is a flow diagram illustrating one exemplary implementation of a routine 1600 for selection operations performed in an editable plan representation. Examples of editable plan representations 314 and 334 are illustrated in FIGS. 3-10, as described above. As shown in FIG. 16, at a decision block 1610, a determination is made as to whether a workpiece feature or inspection operation representation has been selected by a user in an editable plan representation that is included in a current workpiece feature inspection plan. If it is determined that a selected workpiece feature or inspection operation representation is included in a current workpiece feature inspection plan, then at a block 1620 the position of a current time indicator is altered to a corresponding position along a graphical total time range element and a time shown in a current time display is altered to a corresponding time. The displayed editable plan representation may also be updated to indicate the selected workpiece feature or inspection operation (e.g., it may be highlighted and/or may become the active target of subsequent commands or operations.)

It will be appreciated that the examples described above with respect to the operations at the block 1320 of FIG. 13 may similarly be utilized as examples for the operations at the block 1620. More specifically, with respect to a transition from the state of FIG. 10 to the state of FIG. 3, rather than selecting the workpiece feature 326F8 in the 3-D view window 320, a user may alternatively select the workpiece feature 316F8 in the editable plan representation 314, or the workpiece feature 336F8 in the editable plan representation 334, so as to result in the illustrated alterations to the position of the current time indicator 382 along the graphical total time range element 383 and to the time shown in the current time display 384 (i.e., to the time of "0:02:02"). Similarly, with respect to the sequence of selections illustrated by FIGS. 5, 7 and 8, for the transition from the state of FIG. 5 to the state of FIG. 7, rather than selecting the workpiece feature 326F7 in the 3-D view window 320, a user may alternatively select the workpiece feature 316F7 in the editable plan representation 314, or the workpiece feature 336F7 in the editable plan representation 334, so as to result in the illustrated alterations to the position of the current time indicator 382 along the graphical total time range element 383 and to the time shown in the current time display 384 (i.e., to the time of "0:01:32"). Similarly, for the transition from the state of FIG. 7 to the state of FIG. 8, rather than selecting the workpiece feature 326F27 in the 3-D view window 320, a user may alternatively select the workpiece feature 316F27 in the editable plan representation 314, or the workpiece feature 336F27 in the editable plan representation 334, so as to result in the illustrated alterations to the position of the current time indicator 382 along the graphical total time range element 383 and to the time shown in the current time display 384 (i.e., to the time of "0:05:24").

As an additional example that may be illustrated by FIG. 6, a user may make a selection of a program element 338 (i.e., which in one implementation may be a type of inspection operation representation) which may correspond to the end of the workpiece feature inspection plan. In such an instance, the corresponding position of the current time indicator 382 may be altered to be at the end of the graphical total time range element 383, and the time shown in the current time display 384 may be altered to be equal to the total time indicated by the execution time indicator 372 of "0:14:34".

Returning to FIG. 16, at a decision block 1630, a determination is made as to whether a workpiece feature or inspection operation representation has been selected in an editable plan representation that is excluded from a current workpiece feature inspection plan. If it is determined that a selected workpiece feature or inspection operation representation is excluded from the current workpiece feature inspection plan, then at a block 1640 an indication/notification is provided that the selected workpiece feature or inspection operation representation is excluded from the current workpiece feature inspection plan and option(s) may be provided for including the workpiece feature. An example of a selection of a workpiece feature that has been excluded from a current workpiece feature inspection plan may be described with respect to FIG. 4. More specifically, as illustrated in FIG. 4, in the editable plan representation 314 of the plan view window 310, a user has currently selected workpiece features 316F8-316F18, for which each of the selected workpiece features is in an exclusion state (i.e., with the associated box unchecked for the workpiece feature exclusion/inclusion elements 318). As described above, in one specific example implementation, the current time indicator 382 may correspondingly be shown at the beginning of the total time range element 383, and the current time display 384 may correspondingly indicate a time of "0:00:00", both of which may provide an indication that the selected workpiece feature(s) are excluded from the current workpiece feature inspection plan. As described above, the workpiece feature exclusion/inclusion elements 318 provide option(s) for including the workpiece features in the workpiece feature inspection plan (e.g., by selecting the associated boxes so as to toggle to the inclusion state where each of the workpiece features will be included and each of the associated boxes will be checked).

At a block 1650, the review and/or editing of the editable plan representation is continued (e.g., as controlled by a user). It will be appreciated that if operations of the block 1650 are reached based on completion of operations of the block 1620, then the current status of the editable plan representation (and the 3-D view) and the status of the simulation status and control portion may all correspond to the recently selected element in the editable plan representation, as indicated above in the description of the block 1620. Therefore, in such a case, according to principles disclosed herein, activating a "play" or "go" element of the simulation animation control portion (in the absence of any further status adjustment) will activate the simulation animation to continue from its current status (that is corresponding to a feature or operation selected at the block 1610). At a decision block 1660, a determination is made as to whether the review and/or editing of the current workpiece feature inspection plan is complete (e.g., as indicated by a user selection for ending the review and/or editing). If it is determined that the review and/or editing is not complete, then the routine returns to the block 1610, otherwise the routine ends.

It should be appreciate that the systems and methods disclosed herein may be implemented in a manner that provides a generally "modeless" editing environment. That is, a user need not enter a "simulation" mode, or an "animation" mode that is separate from an editing mode of operation of the editing environment. A seamlessly responsive editing environment may be provided wherein all the user interface portions or "windows" are maintained up to date and synchronized with the latest editing operations, regardless of the portion of the user interface that is used to perform the editing operations. For example, as previously outlined, in various implementations the user interface may include a workpiece inspection program simulation portion configurable to display a 3-D view including at least one of workpiece features on the workpiece and inspection operation representations corresponding to inspection operations to be performed on workpiece features according to a current workpiece feature inspection plan; and an editing user interface portion comprising an editable plan representation of the current workpiece feature inspection plan for the workpiece corresponding to the CAD file, the editable plan representation comprising at least one of workpiece features or inspection operation representations. In various embodiments, the system may configured with both of the 3D view and the editable plan representation being automatically responsive to editing operations included in a first set of editing operations, regardless of whether the editing operations included in the first set of editing operations are performed in the 3D view or the editable plan representation of the user interface. For example, the first set of editing operations may comprise deleting (or adding) at least one workpiece feature in the 3D view or the editable plan representation of the user interface. The 3D view and the editable plan representation are configured such that they are both automatically responsive to deleting (or adding) the at least one workpiece feature in the 3D view or the editable plan representation the user interface, by automatically deleting (or adding) the at least one workpiece feature and associated inspection operations in both the 3D view and the editable plan representation.

The system may include an inspection path/sequence manager. The inspection path/sequence manager may be also be automatically responsive to editing operations included in a first set of editing operations as described in greater detail below, regardless of whether the editing operations included in the first set of editing operations are performed in the 3D view or the editable plan representation of the user interface.

The system user interface may also include a program view portion. The program view portion may be also be automatically responsive to editing operations included in a first set of editing operations, regardless of whether the editing operations included in the first set of editing operations are performed in the 3D view or the editable plan representation of the user interface, or in the program view portion itself.

One embodiment of a "general synchronized" and/or "real time globally updated" editing environment is illustrated in FIGS. 17-20. It will be appreciated that certain numbered elements 3XX of the user interface 305 may correspond to and/or be provided by similarly numbered elements of previous figures, except as otherwise described below.

Figure 17:
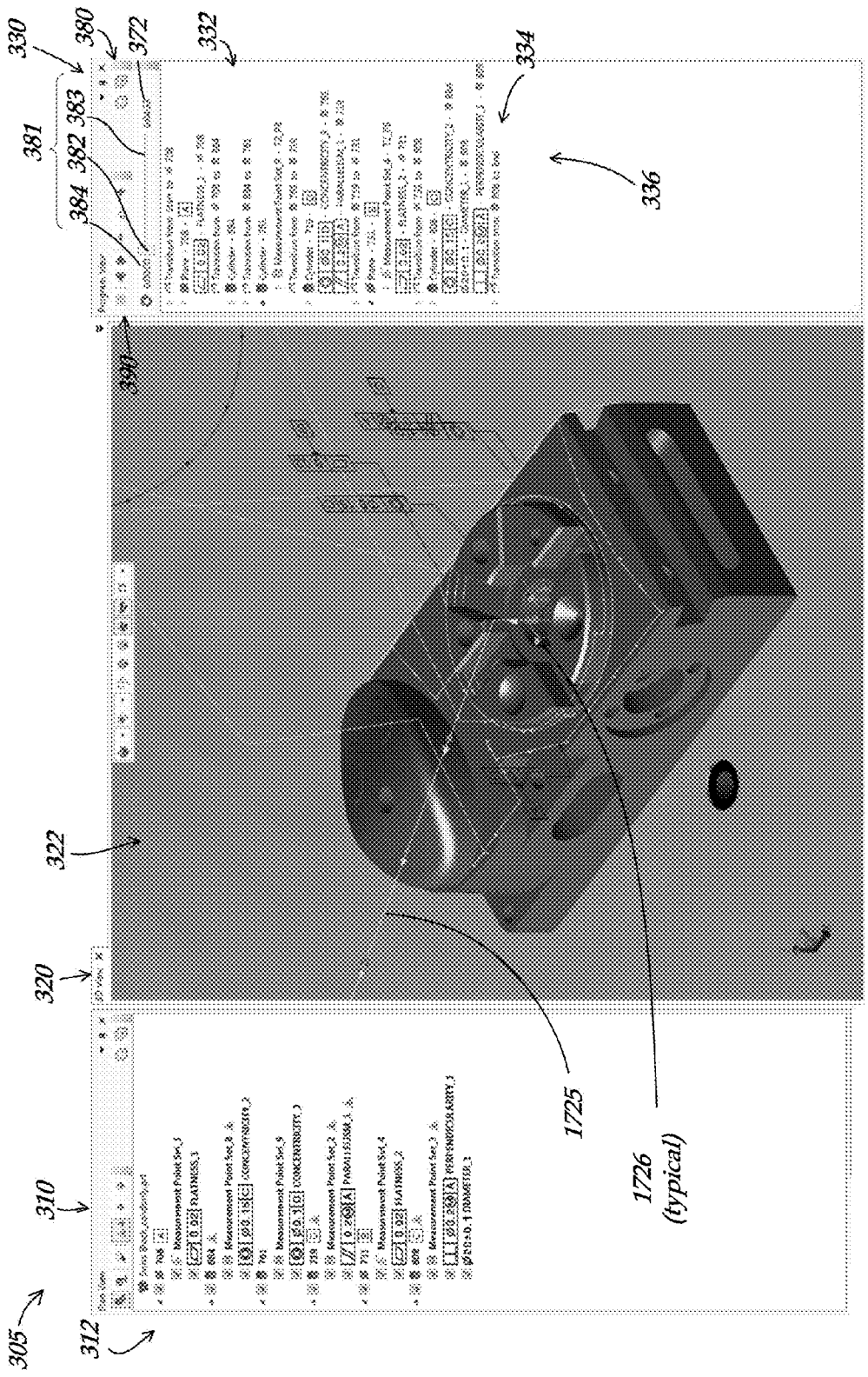
FIG. 17 is a diagram of a user interface illustrating a state of an editable plan representation, a 3D view, and a program view prior to selecting or indicating a target feature for an editing operation as disclosed herein.
Figure 18:
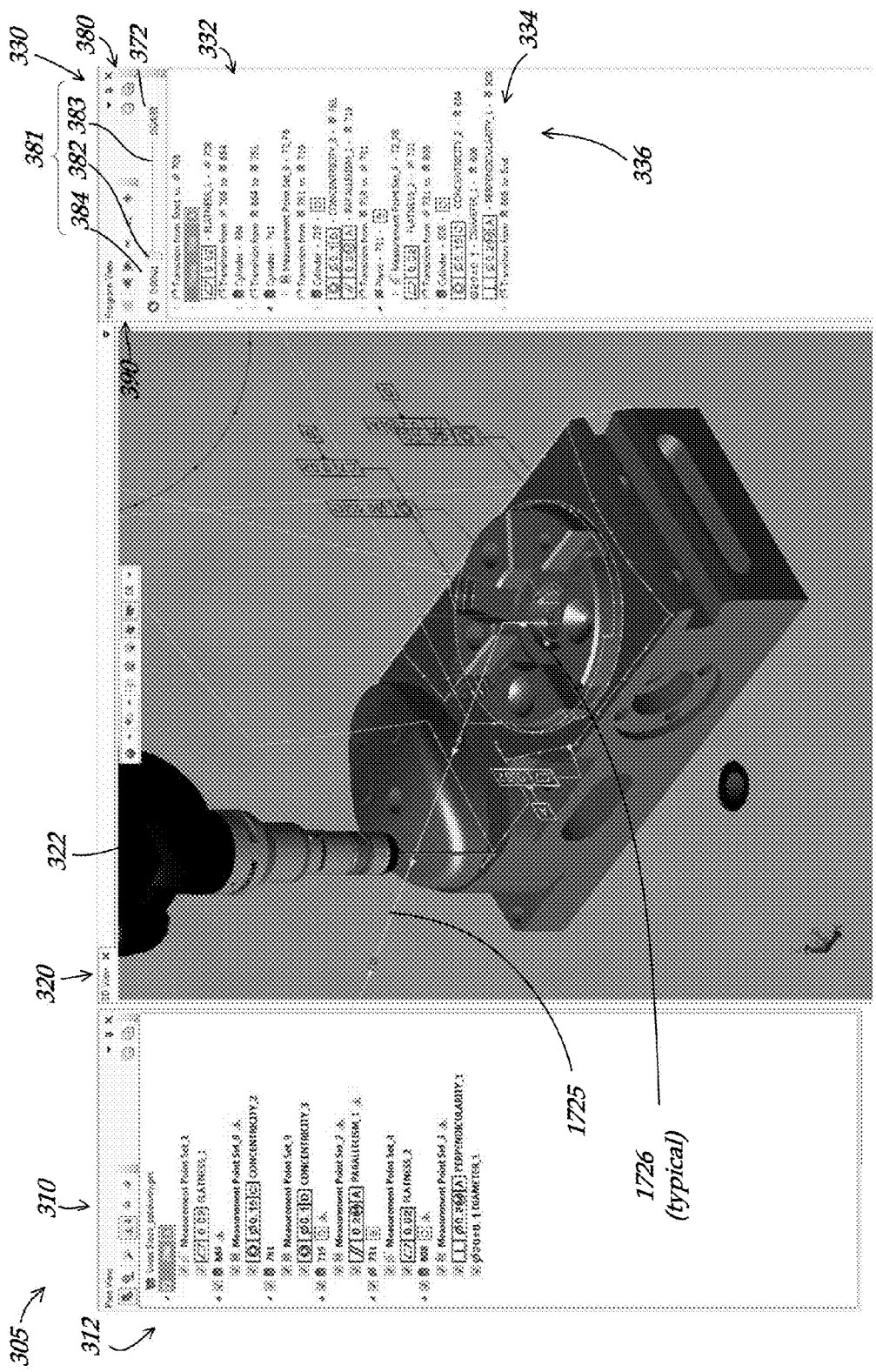
FIG. 18 is a diagram of a user interface illustrating a state of an editable plan representation, a 3D view, and a program view after selecting or indicating a target feature for an editing operation as disclosed herein.

FIG. 17 is a diagram of a user interface illustrating a state of the plan view window 310, the 3-D view window 320 and the program view window 330 prior to selecting or indicating a target feature for an editing operation as described further below. The detailed inspection plan is a different one than that illustrated in previous figures. The 3-D view window 320 includes a displayed motion path representation 1725 and displayed measurement points 1726, corresponding to those of the current inspection plan represented in the various windows FIG. 18 is a diagram of a user interface illustrating a state of the plan view window 310, the 3-D view window 320 and the program view window 330 after selecting or indicating a target workpiece feature (labeled "708" in the plan view window 310 or program view window 330, and indicated by the highlighted plane in the 3-D view window 320) for an editing operation as disclosed herein. Such a selection or indication may be achieved by the user hover a mouse cursor or the like on the target workpiece feature in the plan view window 310 or the 3-D view window 320, or clicking on the target feature, for example.

Figure 19:
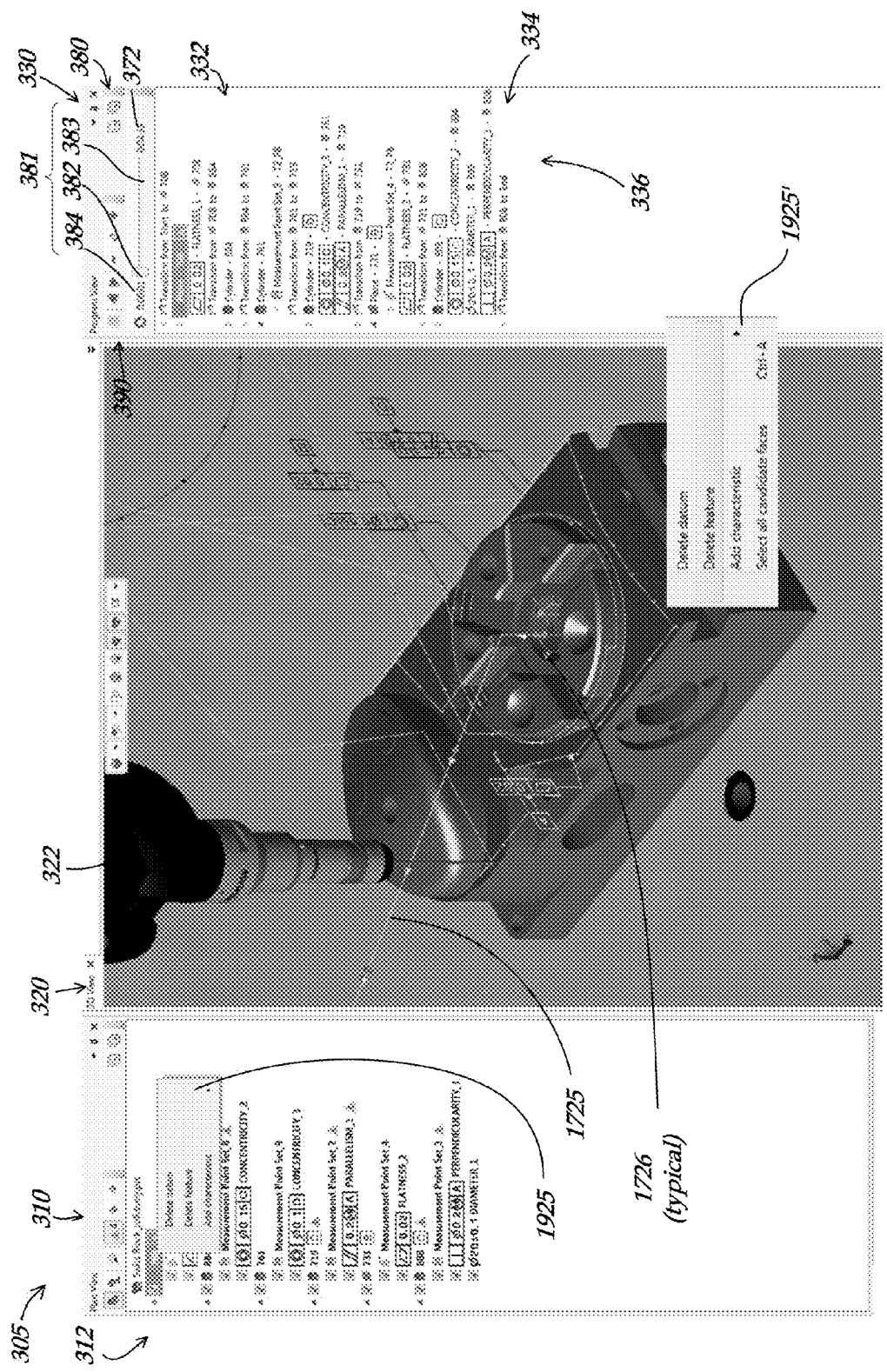
FIG. 19 is a diagram of a user interface illustrating a state of an editable plan representation, a 3D view, and a program view after performing an operation that enables performing a feature deleting editing operation as disclosed herein.

FIG. 19 is a diagram of a user interface illustrating a state of the plan view window 310, the 3-D view window 320 and the program view window 330 after selecting or indicating the target workpiece feature shown and described in FIG. 18, after performing an operation that enables performing a feature deleting editing operation. In particular, after the selection or indication performed as describe above with reference to FIG. 18, the user may right click on the targeted workpiece feature to display a context sensitive menu 1725 (e.g. if right clicking on the feature labeled "708" in the plan view window 310), and/or to display a context sensitive menu 1725' (e.g. if right clicking on the corresponding highlighted plane in the 3-D view window 320. Then in either the plan view window 310 or the 3-D view window 320, the user may click on the "delete feature" command to perform and editing operation that deletes the target feature from the current inspection plan.

Figure 20:
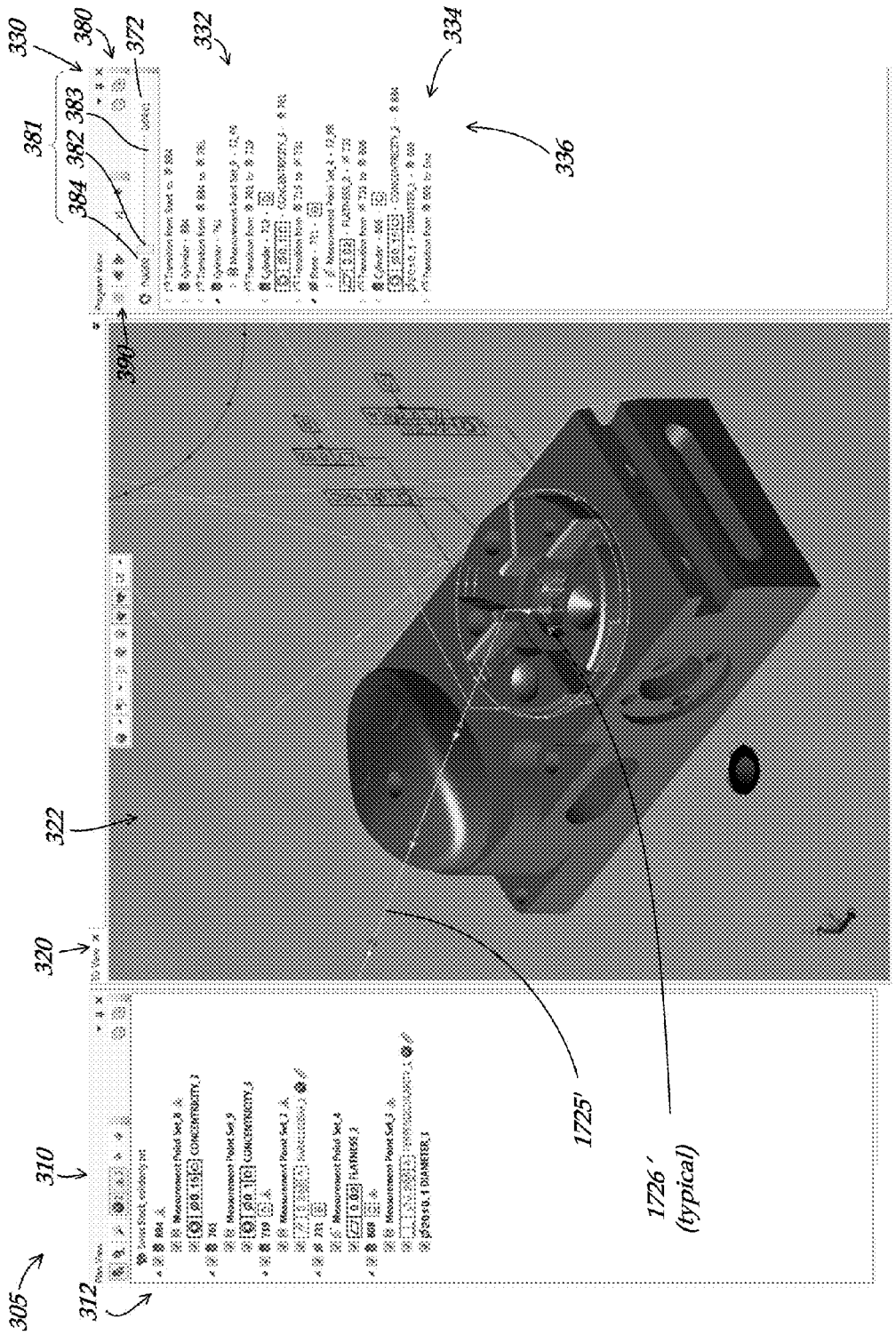
FIG. 20 is a diagram of a user interface illustrating a state of an editable plan representation, a 3D view, and a program view after performing the feature deleting editing operation shown in FIG. 19.

FIG. 20 is a diagram of a user interface illustrating a state of a state of the plan view window 310, the 3-D view window 320 and the program view window 330 after performing the editing operation that deletes the target feature from the inspection plan as outlined above with reference to FIG. 19. It should be noted that due to the use of the global real time updating and user interface synchronization principles previously disclosed herein, that the feature 708 has been deleted from the plan view window 310 and the program view window 330, and the corresponding plane is no longer highlighted in the 3-D view window 320. Furthermore, the inspection path/sequence manager has automatically responded to the editing operation to delete the motion path segments and measurement points associated with the deleted feature, as indicated by the modifications of the motion path representation 1725' and displayed measurement points 1726', in comparison to those illustrated in the motion path representation 1725 and displayed measurement points 1726 shown in FIGS. 17-19. It should be appreciated that all of the user interface updates outlined here may occur in all their respective portions of the user interface regardless of whether the editing operations are performed in the 3D view window 320 (e.g. using the context sensitive menu 1925') or the editable plan representation shown plan view window 310 (e.g. using the context sensitive menu 1925.)

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the system comprising:
   a computer-aided design (CAD) file processing portion which inputs a workpiece CAD file corresponding to a workpiece and analyzes the file to automatically determine inspectable workpiece features on the workpiece corresponding to a plurality of geometric feature types; and
   a user interface comprising:
      a workpiece inspection program simulation portion configurable to display a 3-D view including at least one of workpiece features on the workpiece and inspection operation representations corresponding to inspection operations to be performed on workpiece features according to a current workpiece feature inspection plan; and
      an editing user interface portion comprising an editable plan representation of the current workpiece feature inspection plan for the workpiece corresponding to the CAD file, the editable plan representation comprising at least one of workpiece features or inspection operation representations,
   wherein:
   the system is configured with both of the 3D view and the editable plan representation automatically reflecting results of editing operations included in a first set of editing operations, regardless of whether the editing operations included in the first set of editing operations are performed in the 3D view or the editable plan representation of the user interface;
   the first set of editing operations comprises deleting at least one workpiece feature in the 3D view or the editable plan representation of the user interface; and
   the 3D view and the editable plan representation are both automatically responsive to deleting the at least one workpiece feature in the 3D view or the editable plan representation of the user interface, by automatically deleting the at least one workpiece feature and associated inspection operations in both the 3D view and the editable plan representation.

2. The system of claim 1, wherein:
   the first set of editing operations comprises adding at least one workpiece feature in the 3D view or the editable plan representation of the user interface; and
   the 3D view and the editable plan representation are both automatically responsive to adding the at least one workpiece feature in the 3D view or the editable plan representation of the user interface, by automatically adding the at least one workpiece feature and associated inspection operations in both the 3D view and the editable plan representation.

3. The system of claim 1, wherein the first set of editing operations comprises deleting at least one inspection operation representation in the 3D view or the editable plan representation of the user interface; and the 3D view and the editable plan representation are both automatically responsive to deleting the at least one inspection operation representation in the 3D view or the editable plan representation of the user interface, by automatically deleting the at least one inspection operation representation in both the 3D view and the editable plan representation.

4. The system of claim 3, wherein deleting the at least one inspection operation representation comprises deleting a measure point location such that it is no longer measured in the inspection plan.

5. The system of claim 3, wherein deleting the at least one inspection operation representation comprises deleting a feature characteristic determination, such that it is no longer characterized in the inspection plan.

6. The system of claim 5, wherein the feature characteristic determination is a flatness characteristic determination.

7. The system of claim 1, wherein the first set of editing operations comprises adding at least one inspection operation representation in the 3D view or the editable plan representation of the user interface; and the 3D view and the editable plan representation are both automatically responsive to adding the at least one inspection operation representation in the 3D view or the editable plan representation of the user interface, by automatically adding the at least one inspection operation representation in both the 3D view and the editable plan representation.

8. The system of claim 1, wherein:

the 3D view is automatically responsive to deleting the at least one workpiece feature in the editable plan representation of the user interface, by automatically performing at least one of a) deleting an indication that the feature is an inspected feature, or b) deleting an indication of measurement points associated with inspecting the deleted feature, or c) deleting an indication of a motion path between measurement points associated with inspecting the deleted feature.

9. A system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the system comprising:

a computer-aided design (CAD) file processing portion which inputs a workpiece CAD file corresponding to a workpiece and analyzes the file to automatically determine inspectable workpiece features on the workpiece corresponding to a plurality of geometric feature types; and a user interface comprising:

a workpiece inspection program simulation portion configurable to display a 3-D view including at least one of workpiece features on the workpiece and inspection operation representations corresponding to inspection operations to be performed on workpiece features according to a current workpiece feature inspection plan; and an editing user interface portion comprising an editable plan representation of the current workpiece feature inspection plan for the workpiece corresponding to the CAD file, the editable plan representation comprising at least one of workpiece features or inspection operation representations, wherein:

the system is configured with both of the 3D view and the editable plan representation being automatically responsive to editing operations included in a first set of editing operations, regardless of whether the editing operations included in the first set of editing operations are performed in the 3D view or the editable plan representation of the user interface;

the first set of editing operations comprises deleting at least one workpiece feature in the 3D view or the editable plan representation of the user interface;

the 3D view and the editable plan representation are both automatically responsive to deleting the at least one workpiece feature in the 3D view or the editable plan representation of the user interface, by automatically deleting the at least one workpiece feature and associated inspection operations in both the 3D view and the editable plan representation;

the user interface further comprises an execution time indicator that is indicative of an estimated inspection program execution time for operating the CMM to execute a workpiece inspection program corresponding to the current workpiece feature inspection plan as executed by a current CMM configuration;

the system is configured with the execution time indicator being automatically responsive to editing operations included in a first set of editing operations, regardless of whether the editing operations included in the first set of editing operations are performed in the 3D view or the editable plan representation of the user interface;

the first set of editing operations comprises adding or deleting at least one workpiece feature or at least one inspection operation representation, in the 3D view or the editable plan representation of the user interface; and the execution time indicator is automatically responsive to update the estimated inspection program execution time corresponding to the current workpiece feature inspection plan as modified by the editing operations included in a first set of editing operations, so as to automatically indicate the estimated effect of such modifications on the inspection program execution time in an execution time display included in the user interface.

10. The system of claim 9, wherein:

the first set of editing operations comprises adding at least one workpiece feature in the 3D view or the editable plan representation of the user interface; and the 3D view and the editable plan representation are both automatically responsive to adding the at least one workpiece feature in the 3D view or the editable plan representation of the user interface, by automatically adding the at least one workpiece feature and associated inspection operations in both the 3D view and the editable plan representation.

11. The system of claim 9, wherein:

the first set of editing operations comprises deleting at least one inspection operation representation in the 3D view or the editable plan representation of the user interface; and the 3D view and the editable plan representation are both automatically responsive to deleting the at least one inspection operation representation in the 3D view or the editable plan representation of the user interface, by automatically deleting the at least one inspection operation representation in both the 3D view and the editable plan representation.

12. The system of claim 11, wherein deleting the at least one inspection operation representation comprises deleting a measure point location such that it is no longer measured in the inspection plan.

13. The system of claim 11, wherein deleting the at least one inspection operation representation comprises deleting a feature characteristic determination, such that it is no longer characterized in the inspection plan.

14. The system of claim 13, wherein the feature characteristic determination is a flatness characteristic determination.

15. The system of claim 9, wherein:
the first set of editing operations comprises adding at least one inspection operation representation in the 3D view or the editable plan representation of the user interface; and
the 3D view and the editable plan representation are both automatically responsive to adding the at least one inspection operation representation in the 3D view or the editable plan representation of the user interface, by automatically adding the at least one inspection operation representation in both the 3D view and the editable plan representation.

16. The system of claim 9, wherein:
the 3D view is automatically responsive to deleting the at least one workpiece feature in the editable plan representation of the user interface, by automatically performing at least one of a) deleting an indication that the feature is an inspected feature, or b) deleting an indication of measurement points associated with inspecting the deleted feature, or c) deleting an indication of a motion path between measurement points associated with inspecting the deleted feature.

* * * * *